US007200572B2

(12) United States Patent
Beurskens

(10) Patent No.: US 7,200,572 B2
(45) Date of Patent: Apr. 3, 2007

(54) METHOD AND APPARATUS FOR PRICING A COMMODITY

(75) Inventor: Frank Beurskens, Buffalo, NY (US)

(73) Assignee: E-Markets, Inc., Ames, IA (US)

( * ) Notice: Subject to any disclaimer, the term of this patent is extended or adjusted under 35 U.S.C. 154(b) by 1042 days.

(21) Appl. No.: 09/776,162

(22) Filed: Feb. 2, 2001

(65) Prior Publication Data

US 2005/0114252 A1    May 26, 2005

(51) Int. Cl.
*G06Q 40/00* (2006.01)
(52) U.S. Cl. .............................. 705/37; 705/7; 705/10; 705/26; 705/27; 705/35; 705/36
(58) Field of Classification Search .................. 705/7, 705/10, 26, 27, 35, 36, 37
See application file for complete search history.

(56) References Cited

U.S. PATENT DOCUMENTS

| | | | |
|---|---|---|---|
| 5,063,507 A | | 11/1991 | Lindsey et al. |
| 5,285,383 A | | 2/1994 | Lindsey et al. |
| 5,377,095 A | * | 12/1994 | Maeda et al. ................. 705/10 |
| 5,678,041 A | | 10/1997 | Baker et al. |
| 5,701,451 A | | 12/1997 | Rogers et al. |
| 5,706,502 A | | 1/1998 | Foley et al. |
| 5,712,985 A | * | 1/1998 | Lee et al. ...................... 705/7 |
| 5,794,207 A | | 8/1998 | Walker et al. |
| 5,963,952 A | | 10/1999 | Smith |
| 6,195,646 B1 | * | 2/2001 | Grosh et al. .................. 705/26 |

OTHER PUBLICATIONS

Commodity trading manual, Chicago Board of Trade 1994.
Microsoft Press Computer Dictionary Copyright 1997.
Developing Client/Server Applications with Oracle Developer/2000.

* cited by examiner

*Primary Examiner*—Nga Nguyen
(74) *Attorney, Agent, or Firm*—Galbreath Law Offices, P.C.; John A. Galbreath

(57) ABSTRACT

A method of pricing a commodity involving selecting a predetermined market factor, determining at a first time period a first market condition, and providing a formula capable of comparing a predetermined market factor to a market condition to determine the existence of a favorable pricing condition. The method prices a first portion of the commodity when the application of the formula to the predetermined market factor and the first market condition indicates the existence of a first favorable pricing condition. The method prices a second portion of the commodity when the application of the formula to the predetermined market factor and a second market condition indicates the existence of a second favorable pricing condition.

29 Claims, 23 Drawing Sheets

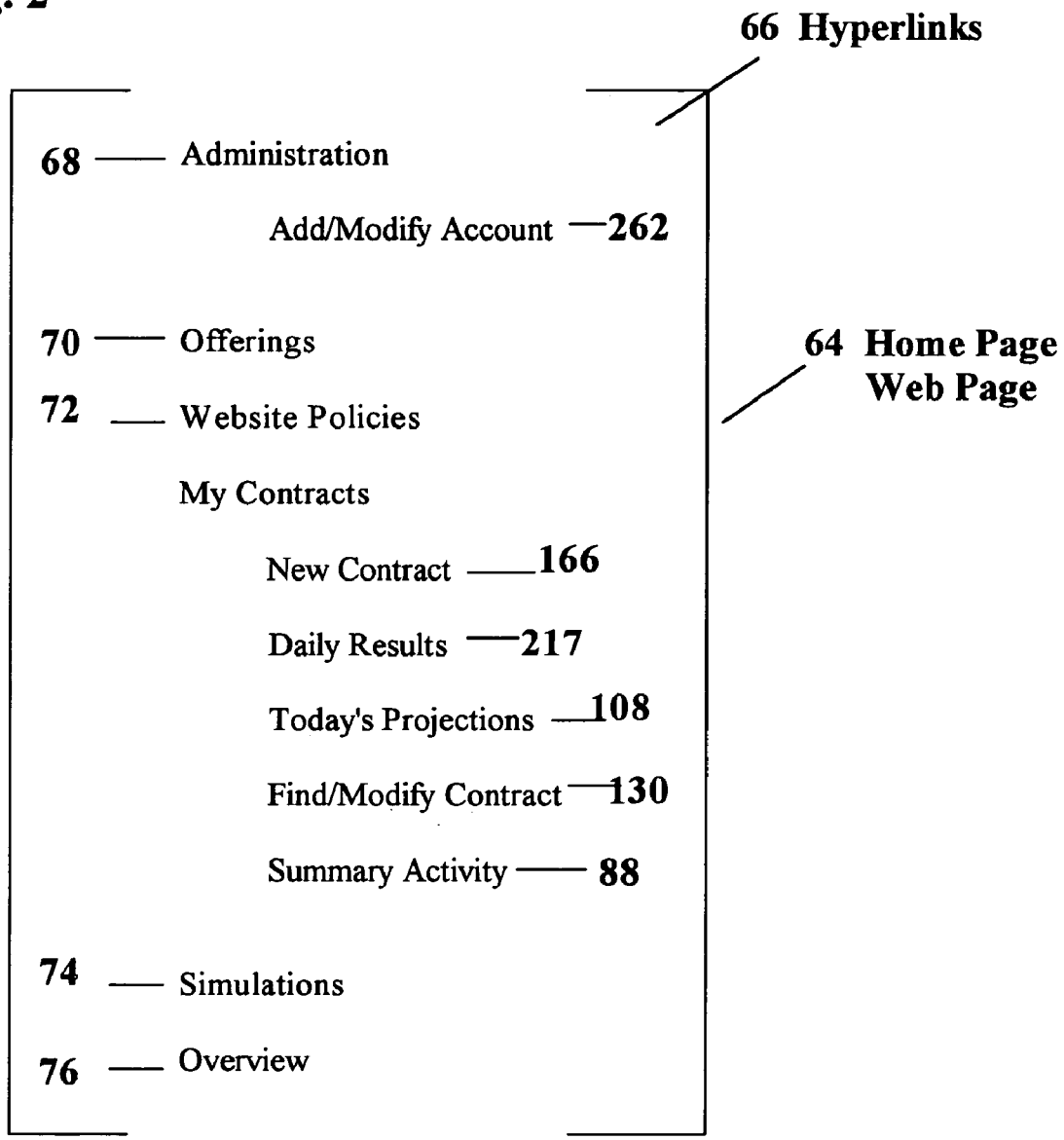

Fig. 4

Home

Summary Pricing Activity on Open Contracts (Select appropriate search criteria, then
Click "View Summary" link to see results.)

Contractor: — 94
ALL
Markets Inc. — 100

Account: — 96
ALL
Demo

— 90
— 92
— 98

Commodity/Reference Contract Month: — 102

View Summary

| Contract Type | Bushels Priced | Total Avg $/Bu | % Sold to Date | Unsold Bushels | # of Contracts |
|---|---|---|---|---|---|
| Market Index Forward | 3454 | 2.52 | 35 | 6546 | |
| Seasonal Index Forward | | 2.27 | | 34586 | |
| Trend Tack Offer | 1818 | 2.52 | 18 | 8182 | |
| Trend Trail Offer | 5943 | 2.52 | 29 | 8057 | |
| Total | 14629 | 2.63 | 21 | 55371 | |

Home 128

Today's Projections 110

Contractor(s) 114
Can select multiple:
[ALL / E-Markets Inc.] 112

Hedging Month: 116
[CZ0] 120

Account(s): 118
Can select multiple:
[ALL / Demo] 122

Price Change
Select one,
or two for a range:
-0.05
-0.04
-0.03
-0.02
-0.01

Run Projection 124

| CZ0 | -0.05 | -0.04 | -0.03 | -0.02 | -0.01 | +0.00 | +0.01 | +0.02 | +0.03 | +0.04 | +0.05 |
|---|---|---|---|---|---|---|---|---|---|---|---|
| Market Index Forward | 182 | 182 | 182 | 182 | 182 | 182 | 182 | 182 | 182 | 182 | 182 |
| Seasonal Index Forward | 223 | 223 | 223 | 223 | 223 | 223 | 223 | 223 | 223 | 223 | 223 |
| Trend Tack Offer | 0 | 0 | 0 | 0 | 0 | 0 | 0 | 0 | 0 | 0 | 0 |
| Trend Trail Offer | 505 | 505 | 505 | 505 | 505 | 505 | 505 | 505 | 0 | 0 | 0 |
| TOTAL | 910 | 910 | 910 | 910 | 910 | 910 | 910 | 910 | 405 | 405 | 405 |

Create New Contract  ⟵168

| | |
|---|---|
| Contractor: | E-Markets Inc. ⟵170, 172 |
| Delivery Location: | E-Markets Inc. |
| Contract Name: | ⟵174 |
| Contract Type: | Market Index Forward ⟵176 |
| Account: | Andy Bose ⟵178, 190 |
| Commodity: | Chicago Board of Trade ⟵180, 182 |
| Quantity: | Corn  ___ bushels ⟵184, 186 |
| Start Date: | __/__/____ (MM/DD/YYYY) |
| End Date: | __/__/____ (MM/DD/YYYY) ⟵188 |

*Choices for Reference Contract Months will be determined by the End Date*

(Click the "Next" button for the next step):  NEXT ⟵192

Fig. 9

Contract Detail

| | | | |
|---|---|---|---|
| Contract #: | 324 | Creation Date: | 2000-05-10 |
| Contractor: | E-Markets Inc. | Delivery Location: | E-Markets Inc. ←—194 |
| Account: | Demo | | |
| Contract Type: | Trend Tack Offer Contract Name: | | Trend Tack |
| Commodity: | Corn | Reference Contract Month: | CZ0 |
| Start Date: | 2000-05-11 | End Date: | 2000-07-30 |
| Trading Days: | 55 | Bushels: | 10000 ←—190 |
| Price at End Option | no | Stop Limit: | 0 |
| Time Span: | 60 | Sensitivity: | .03 |
| Status: | open | | |

(Click on a blue variable to change its value)

Return to Search —196

Cancel This Contract —198

Download Contract —200

Execute Contract —202

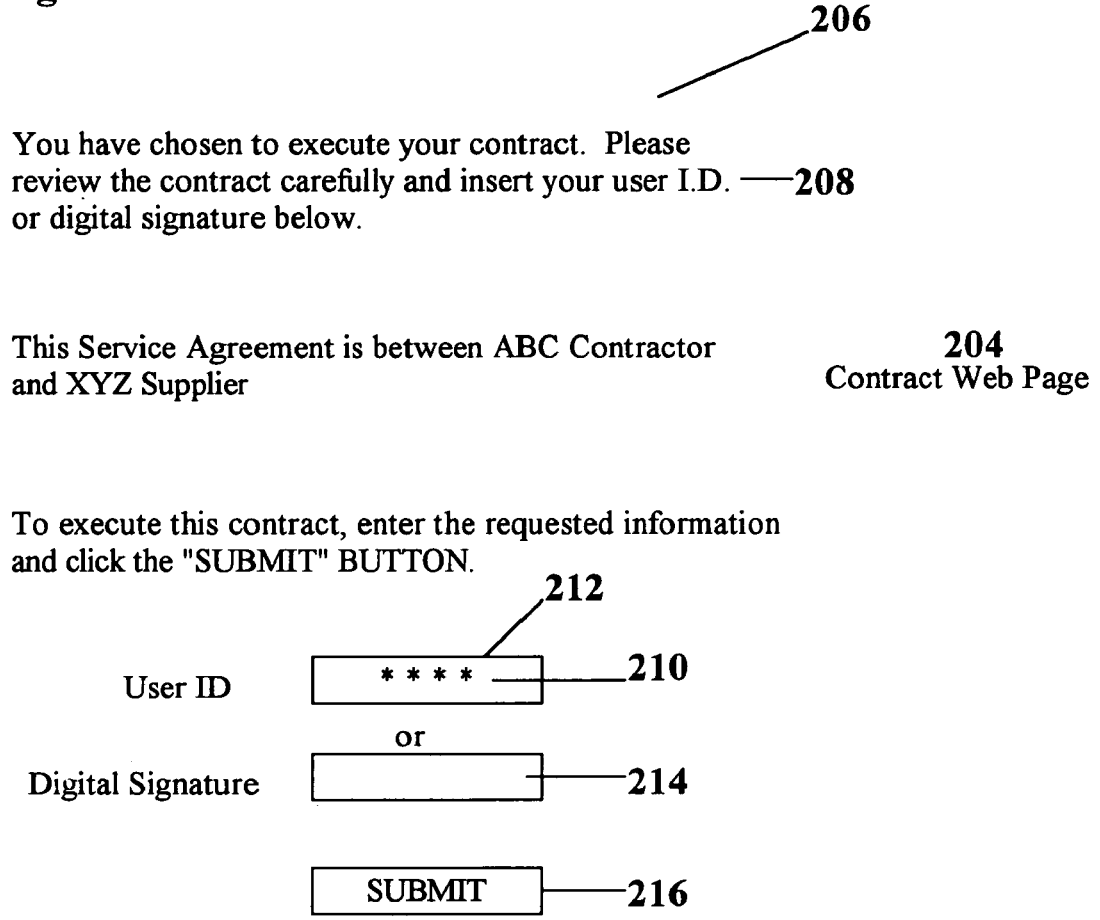

Fig. 11

Today's Results /218

Contractor(s): /220 /226
[ALL / E-Markets Inc. / Grow More]

Account(s): /222
[ALL / Andy Bose / Angie Rieken / Demo / JOHN DOE] /224

Last Trading Day: [2000] / [06] / [07] (YYYY/MM/DD)
*Change date to see other results:*

See Results /228

Home /232

Itemized By Contract Type /230

| Contract Reference Month | Market Index Forward | Seasonal Index Forward | Hight Track Offer | Hight Trail Offer | Market Prospector Offer | Total |
|---|---|---|---|---|---|---|
| CZ0 | 182 | 222 | 0 | 534 | 0 | 938 |
| KWH1 | 0 | 36 | 0 | 0 | 0 | 36 |
| KWYZ0 | 0 | 37 | 0 | 0 | 0 | 37 |

Fig. 12

Today's Projections —234

Contractor(s): —236
Can select multiple:
[ALL / E-Markets Inc. / Grow More] —238

Account(s): 
Can select multiple:
[ALL / Andy Bose / Angie Rieken / Demo / JOHN DOE]

Hedging Month: —240
[CZ0] —242

Price Change
Select one,
or two for a range:
[-0.05 / -0.04 / -0.03 / -0.02 / -0.01] —244

Run Projection —246

Home —248

| CZ0 | -0.05 | -0.04 | -0.03 | -0.02 | -0.01 | +0.00 | +0.01 | +0.02 | +0.03 | +0.04 | +0.05 |
|---|---|---|---|---|---|---|---|---|---|---|---|
| Market Index Forward | 182 | 182 | 182 | 182 | 182 | 182 | 182 | 182 | 182 | 182 | 182 |
| Seasonal Index Forward | 223 | 223 | 223 | 223 | 223 | 223 | 223 | 223 | 223 | 223 | 223 |
| Trend Tack Offer | 0 | 0 | 0 | 0 | 0 | 0 | 0 | 0 | 0 | 0 | 0 |
| Trend Trail Offer | 505 | 505 | 505 | 505 | 505 | 505 | 505 | 505 | 0 | 0 | 0 |
| TOTAL | 910 | 910 | 910 | 910 | 910 | 910 | 910 | 910 | 405 | 405 | 405 |

Fig. 15

| 278 Supplier No. | 280 Supplier | 282 e-mail Address | 284 Address | 286 Other | 288 Zip Code | 290 Supplier Password |
|---|---|---|---|---|---|---|
| S182 | Randy Boals | rboals@... | RR 7 ... | xxxxx | xxxxx | 137XA |
| S183 | Mike Iker | mike@... | 132 Hwy 17 ... | xxxxx | xxxxx | GLM4 |
| S184 | Bill Watson | wwats@... | 217 143rd Ave... | xxxxx | xxxxx | JPJ143 |
| S185 | Mark Campbell | mcampbell@... | RR 4 | xxxx | xxxxx | 621JJA |
| ... | | ... | ... | ... | ... | ... |

Fig. 16

CONTRACTOR DATABASE 292

| 294 Contractor No. | 296 Contractor Name | 298 e-mail Address | 300 Address | 302 Other | 304 Zip Code | 306 Contractor Password |
|---|---|---|---|---|---|---|
| ... | ... | ... | ... | ... | ... | ... |
| C53 | Cold Mills | cms@.... | RR4 ... | xxxxx | xxxxx | CWT61B |
| C54 | Springfield 4 | SF4@.... | 1708 Hwy 72 ... | xxxxx | xxxxx | VR2751 |
| C55 | Fairview | FVE@.... | 18 N. Union ... | xxxxx | xxxxx | LET231 |
| ... | ... | ... | ... | ... | ... | ... |

Fig. 17

CONTRACT DATABASE

| 310 Contract No. | 312 Supplier No. | 314 Contractor No. | 316 Creation Date | 318 Commodity | 320 Contract Type | 322 End Date | 324 Total Bushels | 326 Priced Bushel | 328 Avg. Price | 330 Status | 332 Other |
|---|---|---|---|---|---|---|---|---|---|---|---|
| ... | ... | ... | ... | ... | ... | ... | ... | ... | ... | ... | ... |
| 321 | S182 | C55 | 2000-05-10 | cbot Corn | Market Index Forward | 2000-06-30 | 10,000 | 3454 | 252 | Expired | xxx |
| 323 | S184 | C53 | 2000-05-10 | cbot Oats | Trend Tack Offer | 2000-08-30 | 20,000 | 8924 | 165 | Open | xxx |
| 324 | S185 | C54 | 2000-05-20 | cbot Soybeans | Custom 4 | 2000-07-30 | 15,000 | 7658 | 450 | Cancelled | xxx |
| ... | ... | ... | ... | ... | ... | ... | ... | ... | ... | ... | ... |

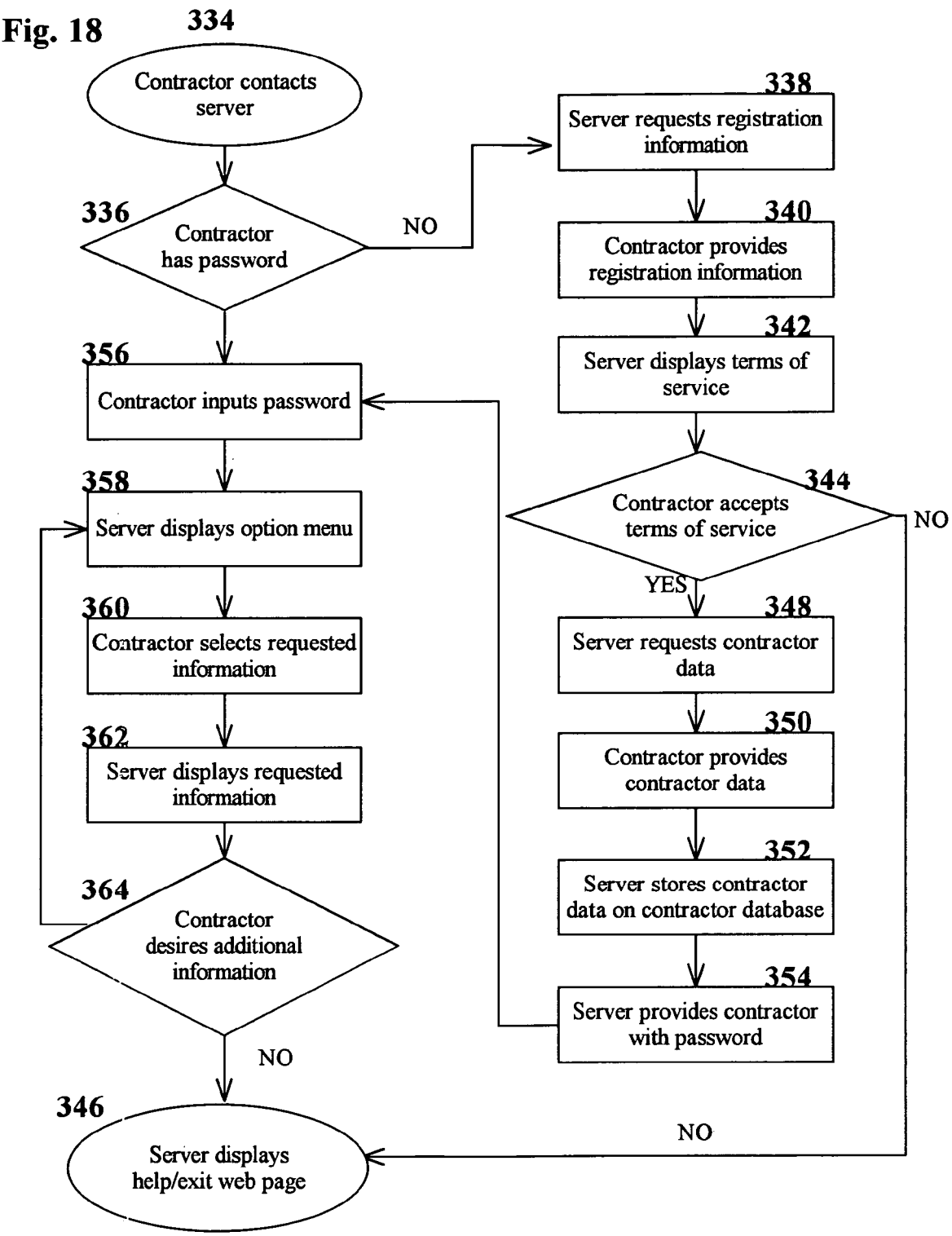

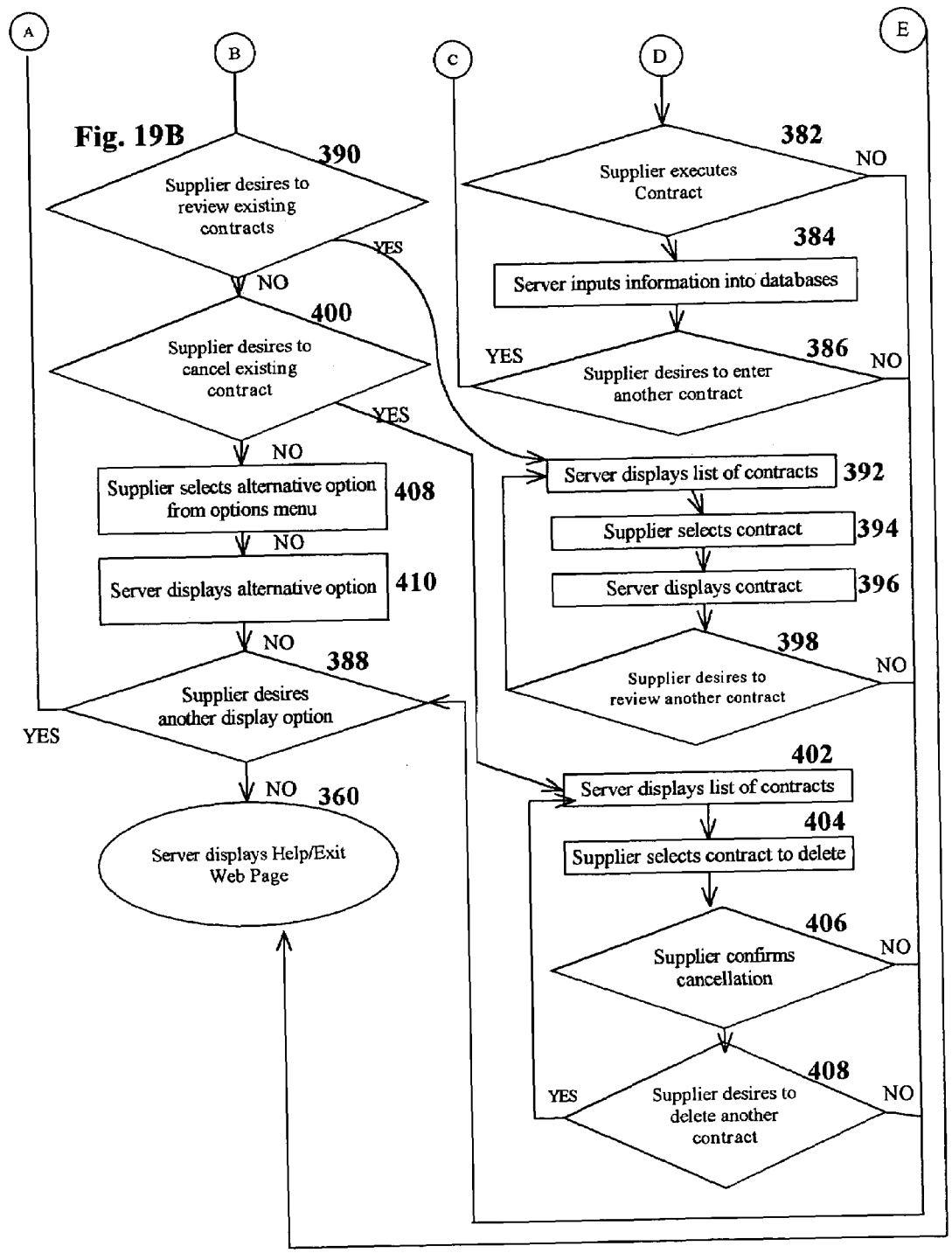

METHOD AND APPARATUS FOR PRICING A COMMODITY

FIELD OF THE INVENTION

The present invention relates generally to a method and apparatus for pricing commodities and, more particularly, to a method and apparatus for pricing commodities at a plurality of time periods, based upon a predetermined formula incorporating market conditions.

BACKGROUND OF THE INVENTION

It is generally known in the art for a supplier of a commodity, such as grain, to agree to contract with a third party, such as an elevator, to price the commodity for transfer at some future date. By pricing the grain prior to delivery, the supplier obtains security against market price volatility. Similarly, with more information concerning future storage needs, the elevator is better able to manage its resources. While this technique reduces risks associated with market volatility, it also prevents a supplier from capitalizing on the same volatility. Preferably, a supplier would desire to price a smaller quantity of commodity at a period when the market is reflecting a lower price, and price a larger quantity of the commodity when the market is reflecting a higher price. Suppliers are often willing to substitute a small increase in risk for an opportunity to capitalize on upward fluctuations in a commodity market.

One drawback associated with pricing smaller amounts of a commodity at different periods of time is the time and effort required to monitor the market, decide on an appropriate tine to price the commodity, and execute the documentation required to price several small quantities of the commodity. As suppliers typically desire to capitalize on market swings shortly after large fluctuations, the suppliers must constantly access information regarding current market conditions. Even a short delay can turn a potential profit into a loss. It would, therefore, be desirable to allow a supplier to capitalize on market fluctuations by allowing the supplier to price portions of a commodity at different time periods, while limiting the time, effort and monitoring required to execute pricing of the commodity over a particular time period.

Over the years, various automated systems have been developed to aid in the trading of commodities. U.S. Pat. Nos. 5,063,507 and 5,285,838 describe utilization of a centralized computer database to facilitate the pricing of bales of cotton. While such a system is useful for markets such as cotton, wherein each individual bale is associated with a particular level of quality control, such a system would not overcome the drawbacks in the prior art associated with the periodic pricing of small quantities of a substantially fungible commodity.

Other patents in the prior art include: U.S. Pat. No. 5,678,041, METHOD FOR RESTRICTING USER ACCESS RIGHTS ON THE INTERNET; U.S. Pat. No. 5,706,502, INTERNET-ENABLED PORTFOLIO MANAGER SYSTEM AND METHOD; and U.S. Pat. No. 5,701,451, METHOD FOR FULFILLING REQUESTS OF A WEB BROWSER. Above-mentioned U.S. Pat. Nos. 5,063,507; 5,285,383; 5,678,041; 5,706,502; and 5,701,451 are incorporated by reference herein, as is commonly owned U.S. patent application No. 09/335,648 for a method for electronically initiating and managing agricultural production contracts. The difficulties encountered in the prior art discussed hereinabove are substantially eliminated by the present invention.

SUMMARY OF THE INVENTION

In an advantage provided by this invention, a method and apparatus is provided for pricing portions of a commodity at various time periods, pursuant to a predetermined formula.

Advantageously, this invention provides a method and apparatus for utilizing pre-determined formulae to price various portions of a commodity.

Advantageously, this invention provides a method and apparatus which allows a commodity supplier to capitalize on upward commodity market volatility.

Advantageously, this invention provides a method and apparatus which reduces the impact on a commodity supplier of market price downturns.

Advantageously, this invention provides a method and apparatus which reduces the need of a commodity supplier to reassess pricing strategy during a pricing period.

Advantageously, this invention provides a method and apparatus which reduces the need of a commodity supplier to monitor market trends during a pricing period.

Advantageously, this invention provides a method and apparatus which increases the security of an investment a commodity supplier has in a particularly commodity.

Advantageously, this invention provides a method and apparatus which can price a greater portion of a commodity during seasonal upturns in a commodity market.

Advantageously, this invention provides a method and apparatus which can price a greater portion of a commodity during periods where a market price is greater than an identified market price trend.

Advantageously, this invention provides a method and apparatus which allows a commodity contractor to more efficiently utilize its resources.

Advantageously, this invention provides a method and apparatus which can price a greater proportion of a commodity during a significant market price rally.

Advantageously, this invention provides a method and apparatus for pricing a greater proportion of a commodity when a market price rally stops or turns downward.

Advantageously, in a preferred example of this invention, a method of pricing a commodity is provided, comprising selecting a predetermined market factor selected from the group consisting of a predetermined time factor, a predetermined price factor, a predetermined trend factor, a predetermined market status factor and a predetermined market control factor. At a first time period, a first market condition is selected from the group consisting of a first time condition, a first price condition, a first trend condition, a first market status condition, a first market control condition, and a formula capable of comparing the predetermined market factor to the first market condition is used to determine the existence of a favorable pricing condition for a first portion of the commodity. The formula is applied to the predetermined market factor and the first market condition to determine the existence of a first favorable pricing condition. A first portion of the commodity is priced when the application of the formula to the predetermined market factor and the first market condition indicates the existence of the first favorable pricing condition. At a second time period, a second marketing condition, selected from the group consisting of a second time condition, a second price condition, a second trend condition, a second market status condition and a second market control condition, is applied with the predetermined market factor to the formula to determine the existence of a second favorable pricing condition, and price a second portion of the commodity when the application of the formula to the predetermined market factor and the second market condition indicates the existence of the second favorable pricing condition.

BRIEF DESCRIPTION OF THE DRAWINGS

The invention will now be described, by way of example, with reference to the accompanying drawings in which:

FIG. 2 illustrates a home page web page, displaying the option menu of the present invention;

FIG. 4 illustrates a summary pricing web page;

FIG. 5 illustrates a commodity projection web page;

FIG. 8 illustrates a contract creation web page;

FIG. 9 illustrates a contract detail web page;

FIG. 10 illustrates a contract execution web page;

FIG. 11 illustrates a contract status web page;

FIG. 12 illustrates a contractor commodity projection web page;

FIG. 15 illustrates a portion of an exemplary supplier database;

FIG. 16 illustrates a portion of an exemplary contractor database;

FIG. 17 illustrates a portion of an exemplary contract database;

FIG. 18 illustrates a flow chart of an exemplary process for allowing a contractor to access, modify or manage an account;

FIGS. 19A–B illustrate a flow chart of an exemplary process for allowing a supplier to create access, modify or manage an account.

DETAILED DESCRIPTION OF THE PREFERRED EMBODIMENT

The Internet comprises millions of computers and computer networks, interconnected to one another for the exchange of information via many avenues, including the World Wide Web (the "Web"). The Web allows a "Server" to send graphical information ("Web Pages") to a remote computer. The remote computer then displays the Web Pages, using a "Browser". A user of the remote computer can locate desired Web Pages using a "Search Engine" and access the Web Pages using a mouse or similar pointing device to "Click" a "Hyperlink" associated with the desired Web Page. A Hyperlink comprises hypertext markup language ("HTML") associated with a Uniform Resource Locator "URL". When clicked, the Hyperlink prompts a Server identified with the URL to send the Web Pages to the user for display.

The present invention provides a method and apparatus for a commodity supplier, such as a commodity producer or such supplier's agent, to utilize the Web, or a similar computer network, to create, modify, manage and cancel contracts associated with the pricing of small quantities of a commodity pursuant to a predetermined formula. The method facilitates a supplier and a contractor entering into an agreement, utilizing the predetermined formula and a predetermined market factor, to price portions of a commodity throughout a predetermined pricing period.

Figure 1A:
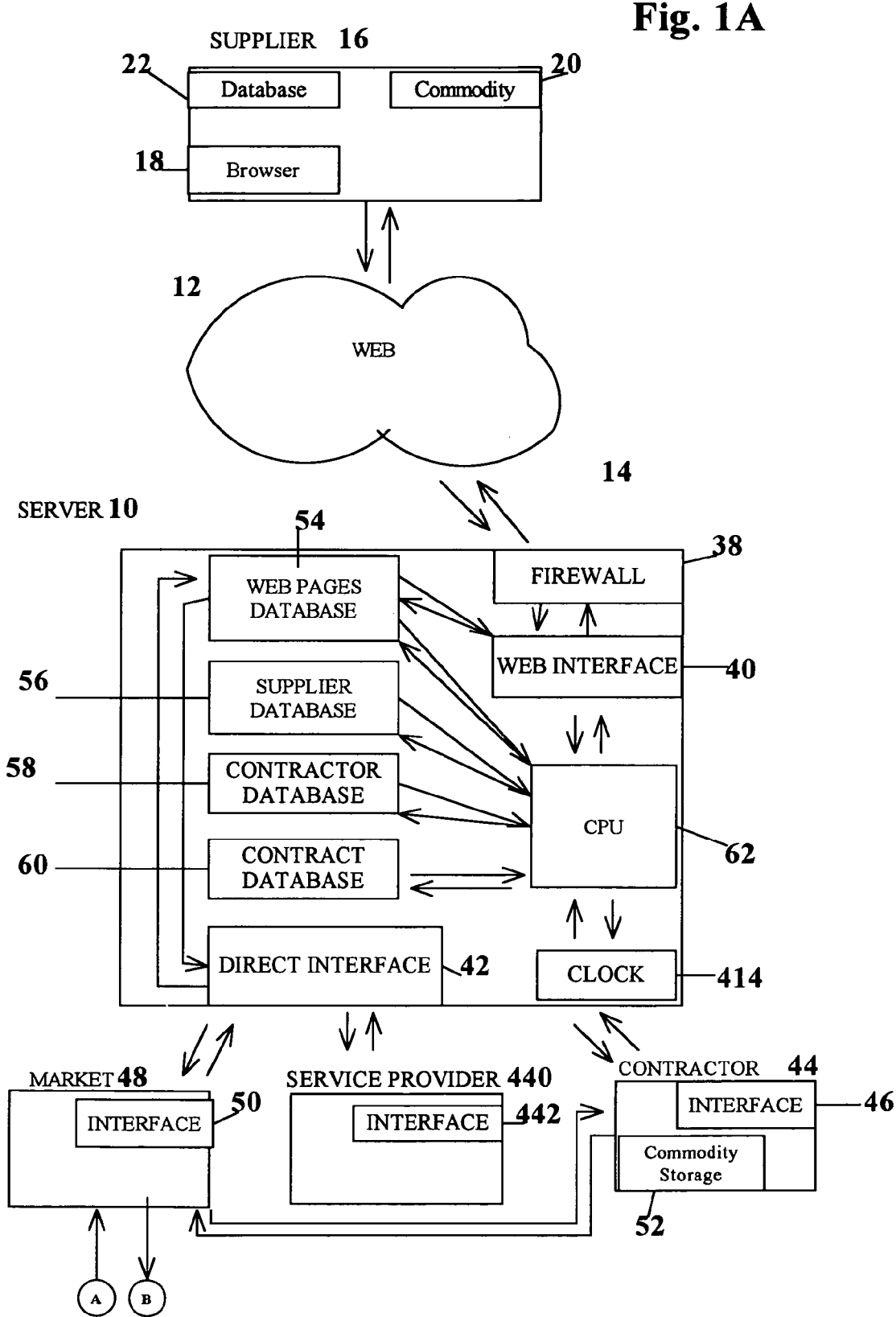
FIGS. 1A–1B illustrate a block diagram of the preferred embodiment of the present invention.
Figure 1B:
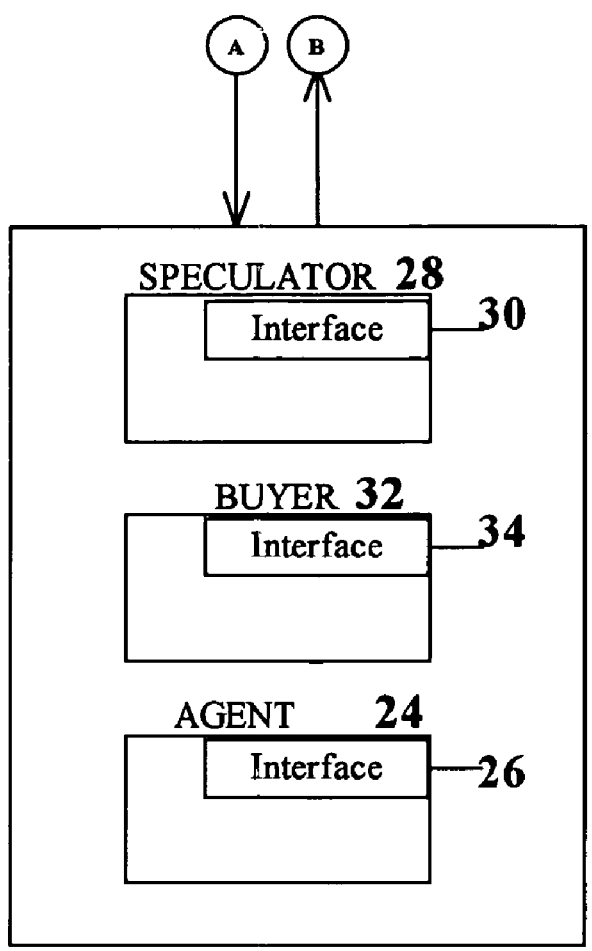

FIG. 1 illustrates a block diagram of the method and apparatus anticipated by the present invention, wherein a web server is designated generally as (10). As shown in FIG. 1, the server (10) is coupled to the World Wide Web (12) by standard connection means (14), such as those well known in the art. It should be noted, that while these connection means (14) are preferably hardware connections, they may instead be wireless connections and may be digital, analog or any other type known in the art. Although in the preferred embodiment the server (10) is connected to the Web (12), it should be noted that the server (10) may be directly connected to all of the other entities described below, by means of an Intranet, the Internet, or by any other type of connection known in the art.

As shown in FIG. 1, a commodity supplier (16) is also connected to the Web (12). The supplier (16) may be a commodity producer, such as a farmer, an entity having access to commodities, such as a grain elevator, a speculator, or any other type of entity desiring to price a commodity during a particular pricing period. As shown in FIG. 1, the supplier (16) is provided with an interface (18), such as a standard Internet browser, like those well known in the art, to allow the supplier (16) to communicate with the server (10), through the Web (12). Alternatively, if the supplier (16) connects directly to the server (10), the interface (18) may be any suitable direct connection interface known in the art.

The supplier (16) is provided with a commodity (20), such as corn, soybeans, oats, or the like. Although the commodity (20) may be one for which there is no established market, but is priced periodically by a small buyer, in the preferred embodiment the commodity (20) is livestock, grain or other fungible type, having an established market for ready liquidation. It should be noted that the supplier (16) need not have a commodity (20) in its possession, but may instead have a contract for the delivery of a commodity at a future date which the supplier (16) wishes to price over a period of time. Alternatively, the supplier (16) may be a speculator, hedging delivery positions, using the method of the present invention.

Preferably, the supplier (16) is also provided with a database (22), containing information regarding the commodity (20). The supplier (16) may either update the database (22) manually or automatically, using information periodically transmitted from the server (10). The database (22) allows the supplier (16) to track all of the supplier's commodities (20) simultaneously, and determine whether a particular pricing strategy should be modified to price more or less of the commodity (20) in the future.

As shown in FIG. 1, the direct interface (42) of the server (10) is coupled to a contractor (44) provided with an interface (46), and is also coupled to a market (48) having an interface (50). The interfaces (46) and (50) are preferably standard interfaces, suitable for direct connection with the direct interface (42) of the server (10). In the preferred embodiment, the contractor (44) is a grain elevator or similar "middle-man", capable of directly receiving a commodity (20), which it may maintain in its storage facility (52) prior to subsequent transfer. The market (48) is preferably an established commodity market, such as the Chicago Board of Trade, or similar market. In the preferred embodiment, the market interface (50) provides for password-protected, digital placement of commodity trades to allow the server (10)

to quickly price a portion of a commodity (20) through either a direct digital connection with the market (48), a connection to the market (48) through the Web (12), or any similar connection means. Although in the preferred embodiment the server (10) is shown coupled to a single supplier (16), a single contractor (44) and a single market (48), in the preferred embodiment the server (10) is preferably coupled to several such entities, to provide not only a larger volume of commodity transfer, but more liquidity and storage options for the commodity (20) itself.

An agent (24) is also coupled to the Market (48) and provided with an interface (26), as is a speculator (28), having an interface (30), and a buyer (32), having an interface (34). The interfaces (26), (30) and (34) are preferably similar to the interface (18) described above, in reference to the supplier (16). In the preferred embodiment, the agent (24) is an entity, acting on behalf of a supplier, to price a commodity using the method of the present invention. The speculator (28) is preferably an entity attempting to capitalize on market fluctuations, and may, or may not, ever take or make actual delivery of a commodity. Preferably the buyer (32) is a value-added entity, transforming a commodity, such as corn, into a higher priced product, such as corn chips.

The server (10) is preferably a Unix based server, such as those well known in the art, coupled to the Web (12) through a firewall (38) and standard Web server interface (40), such as Apache Web server software, manufactured by Apache Software Foundation of Lincoln Nebraska. As shown in FIG. 1, the server (10) is also provided with a direct interface (42), which allows the server (10) to directly communicate with other entities, without the necessity of having to send information (12) across the Web (12) or other public network. The direct interface (42) is preferably provided with an internal firewall, or similar security protection means to prevent unauthorized access to, or modification of, the server (10). The direct interface (42) and associated firewall may be of any type known in the art. Sensitive information is preferably transmitted using a secure socket layer, ("SSL"), or similar secure means, to prevent unauthorized access to such information.

As shown in FIG. 1, the server (10) is provided with a database (54) of Web Pages which are described below in greater detail. The server (10) is also provided with a database of suppliers (56), a database of contractors (58), and a database of contracts (60). These databases (54), (56), (58) and (60) are coupled to a central processing unit (62), which, in the preferred embodiment, is a standard central processing unit utilized with a Web Server to access a plurality of databases to calculate formulae using real-time data. An example of a suitable central processing unit (62) is a Pentium III chip, manufactured by Intel.

As shown in FIG. 1, the web pages database (54) is coupled to the direct interface (42), the Web interface (40), and the central processing unit (62). The supplier database (56), contractor database (58) and contract database (60) are all coupled to the central processing unit (62), which, in turn, is coupled to the Web interface (40) and direct interface (42). The databases (54), (56), (58) and (60) are all preferably provided with redundancy and backup systems, such as those known in the art, to prevent inadvertent data loss or corruption.

FIG. 2 illustrates a home page web page (64), which includes an options menu (68) constituting a plurality of hyperlinks (66). These hyperlinks (66) are coded in HTML to allow a supplier (16) or other entity to obtain content for an alternate web page by clicking directly on the hyperlinks (66) with a pointing device. As shown in FIG. 2, the home page web page (64) includes hyperlinks (66), identifying a plurality of options, including hyperlink (66) to web pages containing information regarding administrative matters, a hyperlink (70) to a web page listing various commodity contract offerings, a hyperlink (72) to a web page detailing policies associated with the website (78), a hyperlink (66) to web pages used to create, modify or cancel commodity contracts, a hyperlink (74) to a web page containing various simulations of pricing methods in accordance with the present invention, and a hyperlink (76) to a web page containing an overview of the entire Web Site (78). The website (78) comprises the web interface (40) and the web pages contained within the web pages database (54). The hyperlinks (66) described above are merely exemplars, and may be replaced with any desired links to any suitable web pages, including, but not limited to, web pages constructed by third parties outside of the Web Site (78).

Figure 3:
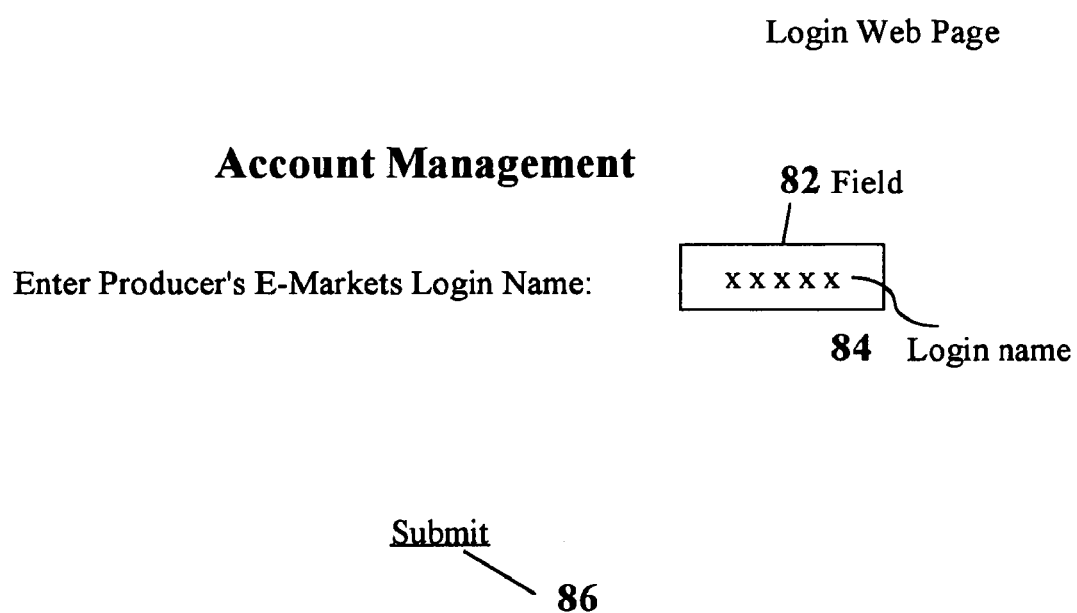
FIG. 3 illustrates a log-in web page.

Shown in FIG. 3 is a log-in web page (80), including an input field (82) for inputting a password (84). If the supplier (16) does not have a password (84), the server (10) may either provide for on-line registration, in a manner such as that described below, or provide the supplier (16) with information relating to registration via standard mail delivery, or any other registration process. Such registration would preferably include information which the server (10) inputs into the supplier database (56). The registration culminates in the server (10) generating a password (84) and forwarding it to the supplier (16). The supplier (16) then inputs the password (84) in the input field (82) of the log-in web page (80). Preferably, the input field (82) is designed to display asterisks as the supplier (16) types in the password (84), to avoid revealing the characters of the supplier's password (84).

Once the supplier (16) inputs the password (84) into the input field (82) of the log-in web page (80), and clicks on the "Submit" button (86) with a pointing device, the server (10) sends the home page web page (64) to the supplier (16). From the home page web page, the supplier (16) may make a selection between the hyperlinks, to determine what additional activity to conduct. If the supplier (16) clicks on the "summary activity" hyperlink (88), the supplier (16) is transferred to a summary pricing web page (90), such as that shown in FIG. 4. As shown in FIG. 4, the summary pricing web page (90) contains a plurality of input fields (92). The input fields (92) include a contractor input field (94), an account input field (96) and a commodity contract month input field (98). As shown in FIG. 4, the supplier (16) uses a pointing device to select information (100) contained within the input fields (92). Once the supplier (16) has selected the desired information (100), the supplier (16) clicks on the "view summary" HTML (102).

Clicking on the "view summary" HTML (102) causes the central processing unit (62) to access the supplier database (56) and contract database (60) to prepare and display the information contained therein in a summary table (104). As shown in FIG. 4, the summary table (104) includes information relating to contract type, bushels priced, price per bushel, percent sold and unsold, the number of contracts, and any other desired information. When the supplier (16) has finished with the summary pricing web page (90), the supplier (16) clicks on the "home" hyperlink (106), which causes the server (10) to send the home page web page (64) to the supplier (16), to allow the supplier (16) to select another option.

If the supplier (16) desires to view pricing projections for that particular day of trading, the supplier (16) simply clicks on the "today's projections" hyperlink (108). (FIGS. 1–2). This causes the server (10) to forward the supplier (16) the supplier projection web page (110) shown in FIG. 5. The supplier projection web page (110) includes a plurality of input fields (112), including a contractor input field (114), a hedging month input field (116), an account input field (118), and a price change input field (120). The supplier (16) selects the desired information (122) contained within the input fields (112), and clicks on the "run projection" HTML (124). Clicking on the "run projection" HTML causes the central processing unit (62) to access the supplier database (56) and the contract database (60) to generate the projection table (126). The projection table (126) displays the number of bushels to be priced for each separate contract, based upon a range of potential price changes. When the supplier (16) has finished with the supplier projection web page (110), the supplier clicks on the "home" hyperlink (128), which causes the server (10) to send the home page web page (64) to the supplier (16).

Figure 6:
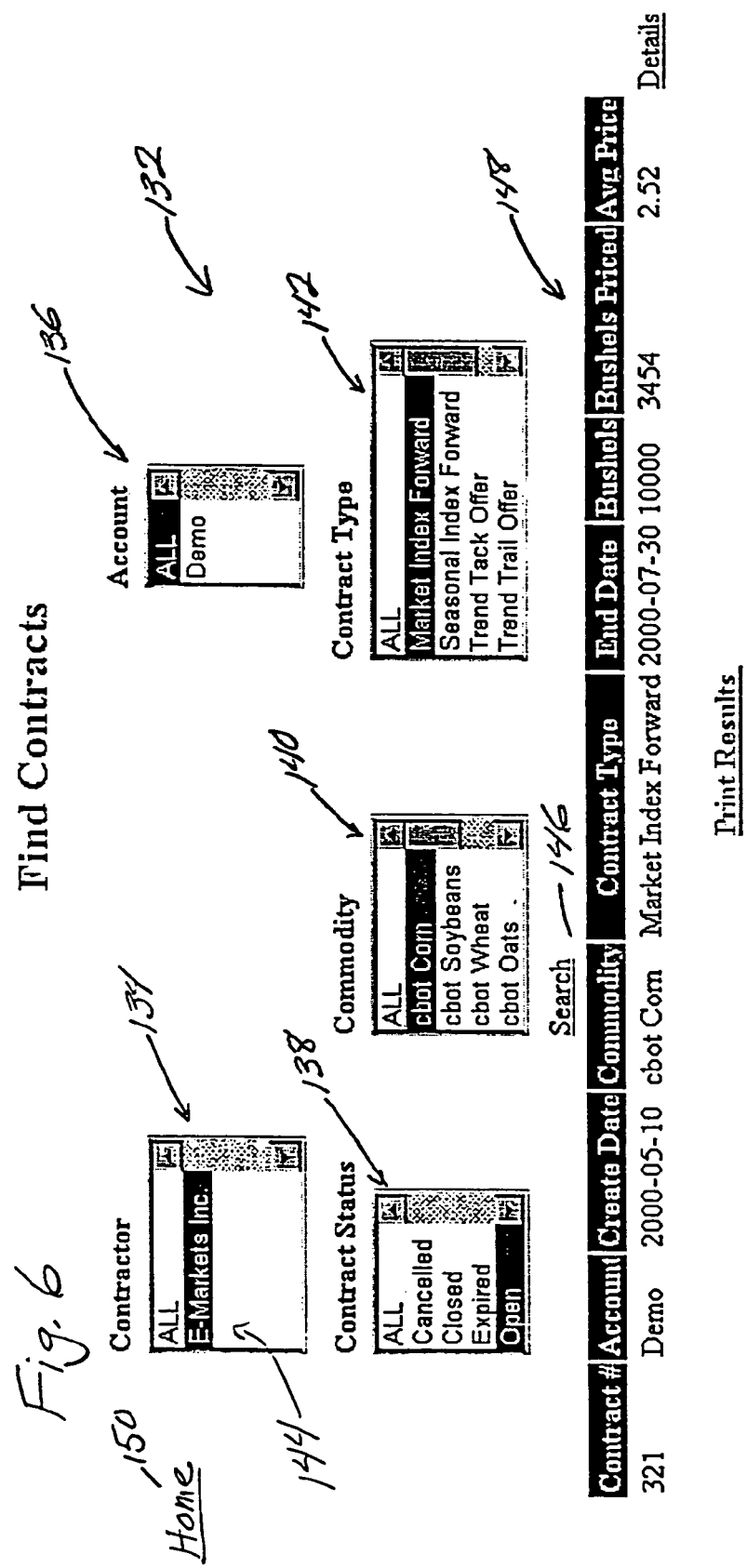
FIG. 6 illustrates a contract search web page.

Once at the home page web page (64), if the supplier (16) desires to find information relating to a particular contract, the supplier (16) clicks on the "find/modify contract" hyperlink (130). (FIGS. 1–2). This action causes the server (10) to send the find contract web page (132) shown in FIG. 6, to the supplier (16). As shown in FIG. 6, the find contract web page (132) includes a contractor input field (134), an account input field (136), a contract status box (138), a commodity input field (140), and a contract type input field (142). The supplier (116) selects the desired information (144) contained within the input fields (134), (136), (138), (140) and (142), and then clicks on the "search" HTML (146). This causes the central processing unit (62) to access the supplier database (56) and contract database (60) to generate the contract table (148), identifying information relating to a particular contract. When the supplier (16) is finished with the find contract web page (132), the supplier (16) clicks on the "home" hyperlink (150), which causes the server (10) to forward the home page web page (64) to the supplier (16).

Figure 7:
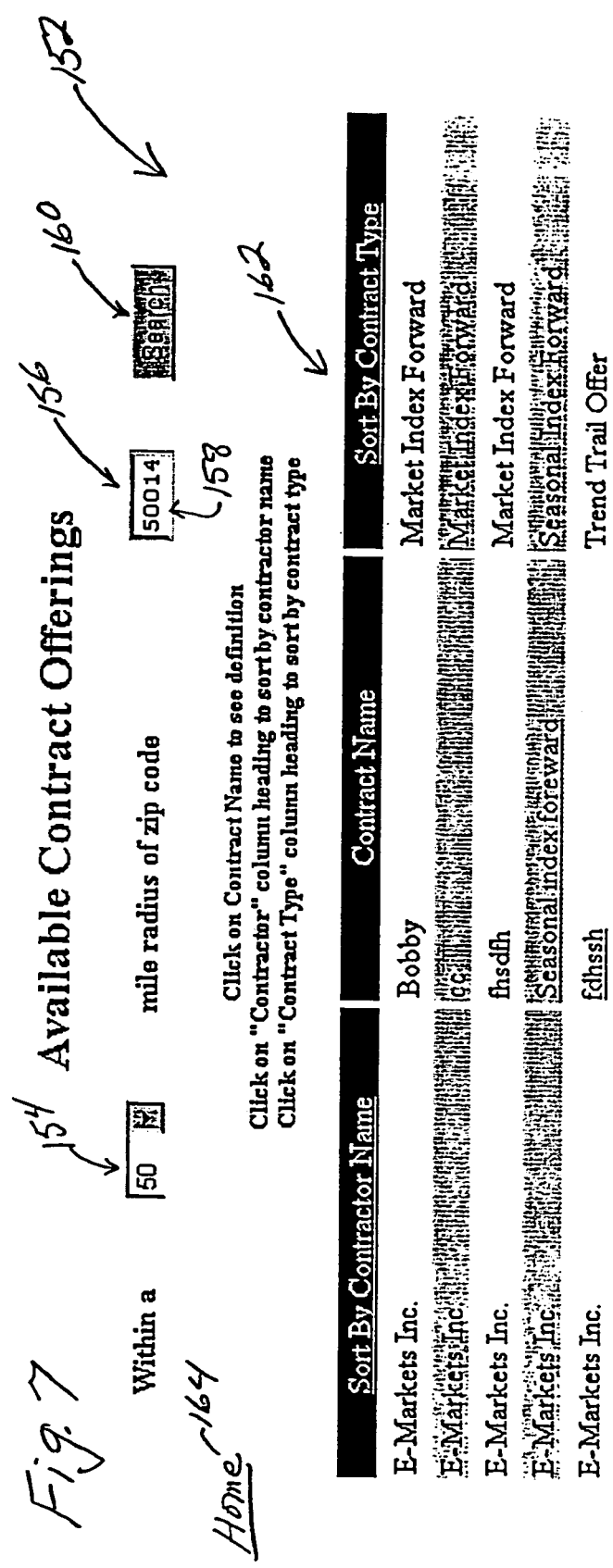
FIG. 7 illustrates a contract availability web page.

If the supplier (16) desires to locate available contract offerings within a particular geographic region, the supplier (16) simply clicks on the "offerings" hyperlink (70), which causes the server (10) to forward the contract offerings web page (152), shown in FIG. 7, to the supplier (16). As shown in FIG. 7, the contract offerings web page (152) includes a distance input field (154) and a zip code input field (156). The supplier (16) inputs into the distance input box (154) the distance from a particular zip code that the supplier (16) can deliver a commodity. Once the supplier (16) has inputted information (158) into the input fields (154) and (156), the supplier (16) clicks on the "search" button (160). Clicking on the search button (160) causes the central processing unit (62) to access the contractor database (58) and the contract database (60) to compile and display the offering table (162) shown in FIG. 7. The offering table (162) lists information regarding the contracts available within the selected radius of the zip code entered by the supplier (16). Once the supplier (16) has finished with the contract offerings web page (152), the supplier (16) clicks on the "home" hyperlink (164), which causes the server (10) to forward the home page web page (64) to the supplier (16).

If the supplier (16) desires to create a new contract, the supplier (16) simply clicks on the "new contract" hyperlink (166). Clicking on the new contract hyperlink (166) causes the server (10) to forward the new contract creation web page (168) to the supplier (16). As shown in FIG. 8, the new contract creation web page (168) includes a contractor input field (170), a (delivery location input field (172), a contract name input field (174), a contract type input field (176), an account input field (178), a commodity market input field (180), a commodity input field (182), a quantity input field (184), a start date input field (186), and an end date input field (188). Once the supplier (16) inputs the desired information (190) into the input fields (170), (172), (174), (176), (178), (180), (182), (184), (186) and (188), the supplier (16) clicks on the "next" HTML (192) which causes the server (10) to compile the information (190) and send it, along with a contract detail web page (194) as shown in FIG. 9, on to the supplier (16).

Once finished reviewing the information (190) contained on the contract detail web page (194), the supplier (16) may click on the "return" HTML (196) to conduct a search for another contract, the "cancel" HTML (198) to cancel the proposed contract, the "download" HTML (200) to download a completed contract, or the "execute" HTML (202) to execute a contract incorporating the information (190) displayed on the contract detail web page (194). Clicking on the "download" HTML (200) prompts the server (10) to incorporate the information (190) into a standard form contract, and transfer the contract to the supplier (16). The supplier (16) may then forward the contract to a contractor (44) for review, or print out the contract for written execution. If the supplier (16) desires to execute a digital contract, the supplier (16) clicks on the "execute" HTML (202), which causes the server (10) to forward the contract web page (204) to the supplier (16). (FIGS. 9–10).

The contract web page (204) includes a contract (206) having a text portion (208). Although the text portion (208) may be of any suitable type desired by the parties or known in the art, in the preferred embodiment, the text portion (208) incorporates the information (190) inputted by the supplier (16) on the new contract creation web page (168). Once the supplier (16) has reviewed and approved the text portion (208) of the contract, the supplier (16) inputs information (210) into either a user ID input field (212) or a digital signature input field (214). As shown in FIG. 10, the information (210) displayed in the input fields (212) and (214) is displayed as asterisks to prevent inadvertent disclosure of the information (210). Once the supplier (16) has inputted the information (210) into one of the input fields (212) or (214), the supplier (16) clicks on the "submit" HTML (216). Clicking on the "submit" HTML (216) causes the server (10) to digitally encode and store a copy of the executed contract (206) for future confirmation. The server (10) also forwards a copy of the executed contract (206) to both the supplier (16) and contractor (44) for their records. The server (10) also updates the supplier database (56), contractor database (58) and contract database (60) to reflect the execution of the new contract (206), and forwards the home page web page (64) to the supplier (16).

If a contractor (44) desires to utilize the method of the present invention, the contractor (44) accesses the log-in web page (80), and inputs its password (84) in the input field (82). If the contractor (44) does not have a password (84), the server (10) provides a password (84) to the contractor (44) in the manner described above. Once the contractor (44) inputs the password (84) and clicks on the "submit" HTML (86), the server (10) cross references the password (84) with the contractor database (58) to determine that the contractor (44) is indeed a contractor and not a supplier. If the contractor (44) desires to obtain that day's results, the contractor (44) clicks on the "daily results" hyperlink (217), causing the server (10) to forward to the contractor (44) the contractor results web page (218) as shown in FIG. 11. The contractor results web page (218) includes a contractor input field (220), an account input field (222) and a last trading day input field (224). The contractor (44) inputs information into the input fields (220), (222) and (224), then clicks on the "results" HTML (228). Clicking on the "results" HTML causes the central processing unit (62) to access the contractor database (58) and contract database (60) to generate the contractor contract table (230), shown in FIG. 11. The contractor contract table (230) shows the quantities of commodity in bushels for each particular contract reference month, and for each particular type of contract. Once the contractor (44) has finished reviewing the contractor contract table (230), the contractor (44) clicks on the "home" HTML (232), which causes the server (10) to forward the home page web page (64) to the contractor (44). (FIGS. 1, 2 and 11).

If the contractor (44) desires to obtain projections for various contracts, the contractor (44) clicks on the "today's projections" hyperlink (108), which causes the server (10) to forward (the contractor projections web page (232), shown in FIG. 12, to the contractor (44). The contractor projections web page (232) includes a contractor input field (234), a hedging month input field (236), an account input field (238) and a price change input field (240). Once the contractor (44) has inserted the desired information (242) into the input fields (234), (236), (238) and (240), the contractor (44) clicks on the "run projection" HTML (244). Clicking on the "run projection" HTML (244) causes the central processing unit (62) to access the contractor database (58) and contract database (60) to generate the contractor projection table (246). When the contractor (44) has finished reviewing the contractor projections web page (232), the contractor (44) clicks on the "home" HTML (248), which causes the server (10) to forward the home page web page (64) to the contractor (44).

Figure 13:
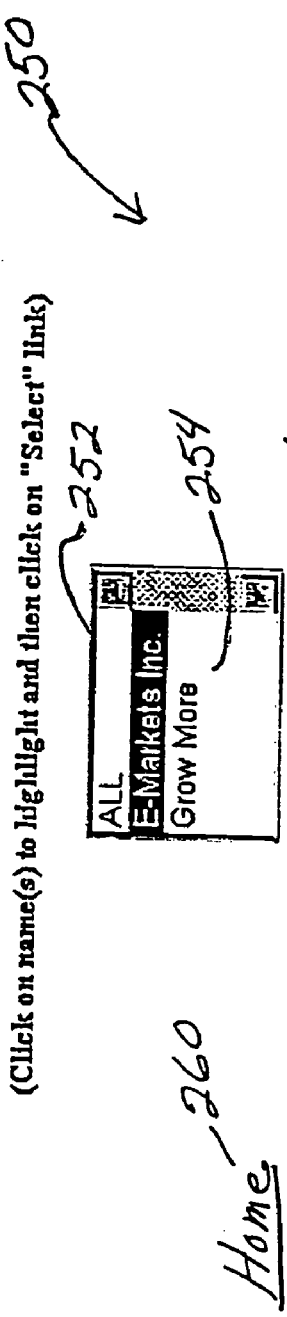
FIG. 13 illustrates a current offerings web page.

If the contractor (44) desires to review current contract offerings, the contractor (44) clicks on the "offerings" hyperlink (70), which causes the server (10) to forward the current offerings web page (250), shown in FIG. 13, to the contractor (44). The current offerings web page (250) includes a contractor input field (252), into which the contractor (44) inputs information (254) before clicking on the "select" HTML (256). Clicking on the "select" HTML causes the central processing unit (62) to access the contractor database (58) and contract database (60) to display the offerings table (258). The offerings table (258) displays information related to current contract offerings, including contractor, contract name and type. Once the contractor (44) has finished reviewing the offerings table (258), the contractor (44) clicks on the "home" HTML (260). Clicking on the "home" HTML causes the server to forward the home page web page (64)to the contractor (44).

Figure 14:
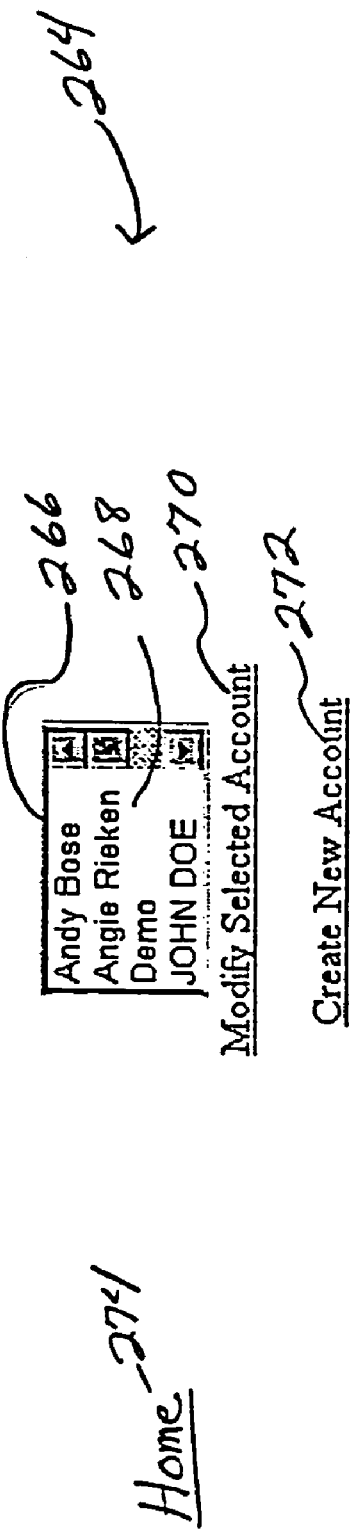
FIG. 14 illustrates an account management web page.

If the contractor (44) desires to manage an account, the contractor (44) clicks on the "add/modify account" hyperlink (262), shown in FIG. 2. This causes the server (10) to forward the account management web page (264) to the contractor (44). As shown in FIG. 14, the account management web page (264) includes an account input field (266), within which the contractor (44) selects the desired information (268) regarding the desired account to manage. The contractor (44) may then click on the "modify selected account" HTML (270), which causes the server (10) to forward to the contractor (44) a web page (not shown) containing a plurality of input fields containing information which the contractor (44) may modify. Alternatively, if the contractor (44) wishes to create a new account, the contractor (44) merely clicks on the "create new account" HTML (272), which causes the server (10) to forward to the contractor (44) a web page (not shown) containing input fields prompting the contractor (44) to input information regarding the new account. Once the contractor (44) has finished with the account management web page (264), the contractor (44) clicks on the "home" hyperlink (274), which causes the server (10) to forward to the contractor (44) the home page web page (64).

Shown in FIG. 15 is a supplier database (276). The supplier database (276) includes fields for a server assigned supplier number (278), supplier name (280), e-mail address (282), street address (284), other information (286), zip code (288), and supplier password (290), for each supplier (16). (FIGS. 1 and 15). The other information (286) may include confidential and/or non-confidential information. The other information (286) may include information relating to various aspects of the supplier commodity, such as high oil content, rot resistance, etc. The supplier database (276) is preferably contained within the server (10), as is a contractor database (292). (FIG. 1).

As shown in FIG. 16, the contractor database (292) includes fields for a server-assigned contractor number (294), contractor name (296), e-mail address (298), street address (300), other information (302), zip code (304), and contractor password (306). As with the supplier database (276), the other information (302) in the contractor database (292) may include confidential and/or non-confidential information, and may include information related to special transportation or storage facilities, overall capacity, special preservation facilities, or the like.

The server (10) also includes a contract database (308), as shown in FIG. 17. As shown in FIG. 17, the contract database (308) includes fields for server-assigned contract number (310), supplier number (312), contract number (314), creation date (316), commodity (318), contract type (320), end date (322), bushels (324), bushels priced (326), average price (328), contract status (330), and other information (332). The other information (332) may include confidential and/or non-confidential information relating to transportation or delivery, specialty grain characteristics, or any other desired information.

FIG. 18 is a flow diagram of the steps involved in the contractor (44) contacting the server (10) to manage the pricing of commodities in accordance with the method of the present invention. As shown in Step (334), the contractor (44) contacts the server (10), using the interface (46) of the contractor (44), and the direct interface (42) of the server (10). (FIGS. 1 and 18). As noted above, however, this connection can be made over the Web (12) or by any other suitable means of communication. Once the contractor (44) contacts the server (10), the server (10), in Step (336), requests a password (84) at the log-in web page (80). If the contractor (44) does not have a password (84), the server (10), in Step (338), requests registration information from the contractor (44). The contractor (44), in Step (340), inserts the registration information in an input field on a web page forwarded to the contractor (44) by the server (10). Alternatively, the contractor may provide the registration to the server (10) by e-mail, facsimile or any other suitable means of communication.

Once the contractor (44) has provided the registration information, the server (10), in Step (342), displays the terms of service in the form of a "click-wrap" or similar agreement. The terms of service may include a website usage policy, a website policy, or any other suitable material. In Step (344), if the contractor (44) does not accept the terms of service, the server (10), in Step (346), displays a help or exit web page, which may log the contractor (44) off the system, provide a frequently ask questions (FAQs) resource, or provide the contractor (44) with a telephone number to contact a help desk for assistance. If the contractor (44) accepts the terns of service, in Step (344), the server (10), in Step (348), requests background and other data from the contractor (44). The contractor (44) provides the data in Step (350), and, in Step (352), the server (10) stores the data on the contractor database (60).

Once the server (10) has received the data, the server (10), in Step (354), provides the contractor (44) with the password (84), and forwards to the contractor (44) the log-in web page (80), shown in FIG. 3, to allow the contractor (44), in Step (356), to input the password (84) into the input field (82). Once the contractor (44) has inputted the password (84), the server (10), in Step (358) forwards to the contractor (44) the home page web page (64) shown in FIG. 2. In Step (360), the contractor (44) selects the hyperlink (66) associated with the contractor's desired action. As described above, and shown in FIG. 2, the contractor (44) may request information relating to administration, contract offerings, contract modification, contract creation and cancellation, contract simulations, or an overview of activity.

As described above, once the contractor (44) clicks on one of the hyperlinks (66) on the home page web page (64), the server (10), in Step (362), displays the associated web page. Once the contractor (44) obtains the necessary information, if the contractor (44) desires an additional action, the contractor (44), in Step (364), clicks on a "home" hyperlink, which returns the contractor (44) to Step (358), the home page web page (64) with the associated menu being displayed. If the contractor (44) does not desire an additional action, the server (10) displays the help/exit web page identified above in association with Step (346).

Figure 19A:
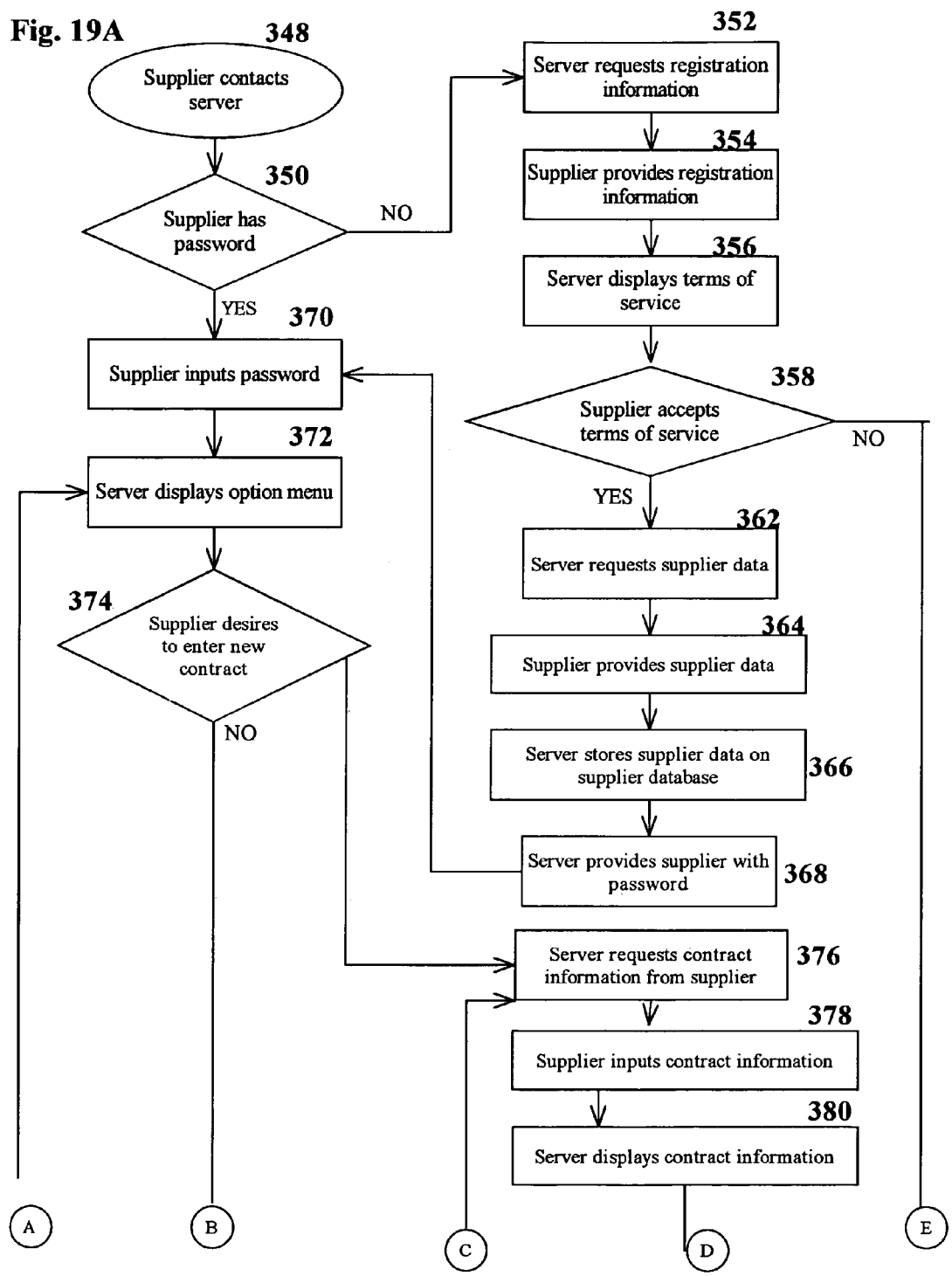

FIGS. 19A–B are a flow diagram of the steps involved in the supplier (16) contacting the server (10) to conduct commodity pricing activities in accordance with the method of the present invention. In Step (348), the supplier (16) contacts the server (10). As shown in Step (350), if the supplier (16) does not have a password (84), the server (10), in Step (352), requests registration information from the supplier (16). The supplier (16), in Step (354), provides the registration information in an input field on a web page displayed by the server (10). The supplier (16) may, of course, forward the information to the server (10) by e-mail, facsimile or any other suitable communication means. Once the supplier (16) has provided the registration information the server (10), in Step (356), displays the terms of service in the form of a click-wrap or similar agreement. In Step (358), if the supplier (16) does not accept the terms of service, the server (10), in Step (360), forwards to the supplier (16) a help/exit web page, which may either log the supplier (16) off the system, provide a FAQ resource, or provide the supplier (16) with the telephone number to contact the help desk for assistance. If the supplier (16) accepts the terms of service, the server (10), in Step (362), requests data from the supplier (16), which the supplier (16) provides in Step (364). In Step (366) the server (10) stores the data on the supplier database (56). The server (10), in Step (368), provides the supplier (16) with the password (84), and forwards to the supplier (16) the log-in web page (80), such as that shown in FIG. 3. The supplier (16), in Step (370), inputs the password (84) in the input field (82).

Once the supplier (16) has input the password (84) in the input field (82), the server (10), in Step (372) displays the options menu associated with the home page web page (64). In Step (374), if the supplier (16) desires to enter into a new contract, the server (10), in Step (376), requests contract information from the supplier (16) in a manner such as that identified in the new contract creation web page (168), shown in FIG. 8. In Step (378) the supplier (16) inputs the contract information (190). In Step (380), the server (10) displays the contract information (190) in a format similar to that shown in the contract detail web page (194), shown in FIG. 9. In Step (382), the contract detail web page (194) provides the supplier (16) with the option of executing the contract (206). (FIGS. 1, 10 and 19A). If the supplier (16) does not choose to execute the contract (206), the server (10) forwards to the supplier (16) the help/exit web page, as described in Step (360).

As shown in Step (382), if the supplier (16) instead executes the contract (206) by clicking on the "execute contract" hypertext mark-up language (202), the server (10), in Step (384), inputs the information (190) into the supplier database (56), contractor database (58), and contract database (60, and forwards an executed copy of the contract to the supplier (16) and to the contractor (44). In Step (386), the server (10) requests information from the supplier (16) as to whether the supplier desires to enter into another contract. If the supplier (16) does not wish to enter into another contract, the server (10), in Step (388), inquires whether the supplier (16) desires another display option. If the supplier (16) does desire another display option, the server (10) returns the supplier (16) to Step (372), displaying the home page web page (64) and associated options menu. (FIGS. 2 and 19A). Alternatively, if the supplier (16) does desire to enter into another contract, the server (10) returns to Step (376), wherein the server (10) requests information from the supplier (16) relating to the additional contract.

Referring back to Step (374), if the supplier does not desire to enter into a new contract, in Step (390) the server (10) requests whether the supplier (16) desires to review existing contracts. If the supplier (16) does wish to review existing contracts, the server (10), in Step (392), displays a list of the supplier's contracts. In Step (394), the supplier (16) selects one of the contracts, and in Step (396), the server (10) forwards to the supplier (16) a web page displaying information relating to the contract in a format similar to that shown in FIG. 9. As shown in Step (398), if the supplier does not desire to review another contract, the server (10) moves to Step (388) where the server (10) inquires whether the supplier (16) desires another display option. If the supplier (16) does desire to review another contract, the server (10) returns to Step (392), displaying a list of the supplier's contracts and the process repeats.

Returning to Step (390), if the supplier (16) does not desire to review existing contracts, the server (10),in Step (400), requests whether the supplier (16) desires to cancel an existing contract. If the supplier (16) does desire to cancel an existing contract, the server (10), in Step (402), displays a list of the supplier's contracts. In Step (404), the supplier (16) selects from the list a particular contract to delete. In Step (406), the server provides detail relating to the contract, similar to that shown in the contract detail web page (194) of FIG. 9, and requests whether the supplier (16) wants to confirm deletion of the contract. If the supplier (16) does not confirm cancellation of the contract, the server (10) routes the supplier (16) to Step (388), wherein the server (10) requests whether the supplier (16) desires another display option. If, however, the supplier (16) confirms the cancellation of the contract, the server (10) deletes the contract and, in Step (408), requests whether the supplier (16) desires to delete another contract. If the supplier (16) does not desire to delete another contract, the server (10) transfers the supplier (16) to Step (388), where the server (10) requests whether the supplier desires another display option. In Step (408), if the supplier (16) does desire to delete another contract, the server routes the supplier (16) back to Step (402) wherein the server (10) displays the list of contracts available for cancellation and the process repeats.

Returning to Step (400), if the supplier (16) does not desire to cancel an existing contract, the server (10), in Step (410), provides the supplier (16) with a list of options from an options menu, such as that shown in the home page (64). (FIGS. 2 and 19B). If the supplier (16) desires an alternative option, the supplier (16) selects the desired option and the server (10), in Step (412), displays the desired option before returning the supplier (16) to Step (388), wherein the server (10) requests whether the supplier (16) desires another display option. As noted above, if the supplier (16), in Step (388), does desire another display option, the server (10) transfers the supplier (16) back to Step (372), wherein the server (10) displays the home page (64) and associated options menu. (FIG. 2). However, in Step (388), if the supplier (16) does not desire another display option, the server (10) routes the supplier (16) to the help/exit web page, as shown in Step (360).

FIG. 20 is a flow diagram of the pricing process utilized by the server (10) in accordance with the method of the present invention. As shown in Step (414), the server (10) is provided with a clock (416), such as those well known in the art. The clock (416) is utilized by a software program contained within the server (10) to calculate a formula at predetermined time intervals. Although the formula is individually tailored to a particular supplier (16), and contractor (44), an example of such a formula would be:

$$(Q)(TQ)=(QP)$$

in which Q represents a time factor reflecting the percentage of the total quantity (TQ) of commodity to price at each time interval, so that (QP) equals the quantity of commodity priced at each time interval. This formula prices a consistent quantity of a commodity each trading day of the contract as identified by the clock (416). For example, if the contract involved 10,000 bushels of corn to be priced over three months, leaving approximately 66 trading days over which equal quantities (1/66) of the commodity are to be priced. Incorporating these figures into the formula, one gets (1/66)(10,000)=152, or 152 bushels of corn being priced every day.

An alternative formula would be one in which different quantities of the commodity are priced at different time periods. An example of such a formula would be:

$$\text{if } (D) \leq (FP)(TD), \text{ then } (Q)(TQ)(A)=QP$$

$$\text{if } (FP)(TD)<(D) \leq (SP)(TD), \text{ then } (QP)(TQ)(B)=(QP)$$

$$\text{if } (SP)(TD)<(D), \text{ then } (Q)(TQ)(C)=(QP)$$

In this formula, (D) represents the trading day 1–66, (FP) represents the percentage of trading days to price at the first price, (SP) represents the percentage of trading days to price at the second price, and (TD) represents the total number of trading days. (A) represents a first quantity factor, (B) represents a second quantity factor, and (C) represents a third quantity factor. (FP),(SP),(TD), (A), (B) and (C) are all market factors predetermined by the supplier (16), contractor (44), or other entity. (D) represents a time factor reflecting the day of the contract. In this type of formula, if in the first third of the total trading days, 20% of the commodity is priced, during the second third of the total trading days, 30% is priced, and during the final third of the total trading days, 50% of the commodity is priced, the calculation would be as follows:

$$\text{if } (D) \leq (1/3)(66), \text{ then } (1/22)(10,000)(0.20)=91$$

$$\text{if } (1/3)(66)<(D) \leq (2/3)(66), \text{ then } (1/22)(10,000)(0.30)=136$$

$$\text{if } (2/3)(66)<(D), \text{ then } (1/22)(10,000)(0.50)=227$$

In yet another alternative embodiment of the present invention, the formula might be one in which the server (10) monitors market activity and is set to price a predetermined portion of a commodity if the closing price on a particular day of trading was higher than a calculated trend factor. Such a formula may look like:

$$\text{if } TP+A>=TFx \text{ and } TP+A>=C, \text{ then } (B)(RQ)/(RD)=QP$$

$$\text{if } TP+A<TFx \text{ or } TP+A<C, \text{ then } QP+0$$

TP represents the daily market closing price. TFx represents the daily trend factor (moving average). TFx=sum (1->x)(TP)/x, where x represents the number of days used to calculate the daily moving average.
RQ=TQ−PQ (remaining quantity=total quantity−priced quantity)
RD=TD−PD (remaining days=total days−passed days)
QP equals the quantity of commodity priced each day.
A is a sensitivity factor used to manage the sensitivity of the model to market fluctuations.
B is an integer multiplier of the base daily quantity determined by the model
C is a predetermined price floor under which no quantity pricing will occur.

In still another alternative embodiment of the present invention, the formula could be one in which the server (10) monitors market activity to price a predetermined portion of the grain immediately subsequent to a price decline. Such a formula may look like:

$$\text{if } TP+A<=TP(D-1) \text{ and } TP+A>=C, \text{ then } (B)(RQ)/(RD)=QP$$

$$\text{if } TP+A>TP(D-1) \text{ or } TP+A<C, \text{ then } QP=0$$

TP represents the daily market closing price.
TP(D−1) represents the previous market closing price.
RQ=TQ−PQ (remaining quantity=total quantity−priced quantity)
RD=TD−PD (remaining days=total days−passed days)
QP equals the quantity of commodity priced each day.
A is a sensitivity factor used to manage the sensitivity of the model to market fluctuations.
B is an integer multiplier of the base daily quantity determined by the model
C is a predetermined price floor under which no quantity pricing will occur.

Alternatively the formula could be set to price a commodity the first time a market closes lower after a significant price rally. Such a formula may look like:

$$\text{if } TFx>=A \text{ and } TP>=C, \text{ then } (B)(RQ)/(RD)=QP$$

$$\text{if } TFx<A \text{ or } TP<C, \text{ then } QP=0$$

TFx represents a daily trend factor or oscillator.
RQ=TQ−PQ (remaining quantity=total quantity−priced quantity)
RD=TD−PD (remaining days=total days−passed days)

QP equals the quantity of commodity priced each day.

A is the trend factor trigger set by the user, under which no pricing will occur.

B is an integer multiplier of the base daily quantity determined by the model.

C is a predetermined price floor under which no quantity pricing will occur.

As shown in FIG. 8, when creating a new contract, a supplier (16) is provided with a contract type input field (176), wherein the supplier (16) is able to pre-select from a plurality of formulae, which may be described in more detail on another web page or in associated literature. The supplier (16) may either select one of the predetermined formulae, such as those described above, or may opt for a custom programmed formula, utilizing market price or other factors which more closely comports with the supplier's associated desire for risk and monitoring. Those skilled in the art will recognize that the time and market factors described above may be modified to address the individual pricing goals of suppliers (16) and contractors (44).

As shown in FIG. 20, once the server (10) is programmed to utilize the clock (416) to price portions of the commodity, or to calculate the formula at predetermined times, the server (10) waits until Step (418), in which the clock (416) signals the predetermined time has been reached for the server (10) to calculate the formula. In Step (420), the server (10) obtains the formula at a predetermined time selected by the supplier (16), contractor (44), or other entity. In Step (422), the server (10) obtains one of the predetermined market factors from the contract database (60). In addition to the predetermined market factors noted above, the predetermined market factors may relate to the particular contract type selected by the supplier (16), the percentage that a closing price must be above the previous day's close to cause a portion of the commodity to be priced, and/or the number of days a market rally must continue before a market downturn triggers pricing a predetermined quantity of the commodity.

As shown in Step (424), the server (10) examines whether the formula includes a time factor. If so, the server (10), in Step (426), obtains the current time from the clock (416) and incorporates it into the formula, whereafter the server (10) moves to Step (428). In Step (424), if the server (10) determines the formula does not comprise a time factor, the server (10) also moves to Step (428). In Step (428), the server (10) determines whether the formula comprises a market trend factor. A market trend factor, such as that described above, would constitute a factor based upon downturns or rallies in a particular market. The factor may either relate to the size of the downturn or rally, or the number of days a rally or downturn has continued. If the formula comprises a market trend factor, the server (10) in Step (430) obtains the current market trend information and incorporates it into the formula, and moves to Step (432). Similarly, if in Step (428) the server (10) determines the formula does not comprise a market trend factor, the server (10) moves to Step (432), wherein the server (10) determines whether the formula comprises a price factor.

If the formula does comprise a price factor, then, in Step (434), the server (10) obtains the current market price information and incorporates it into the formula. Such market price information could constitute a set price point, or a price point related to a particular time period. After the server (10) has obtained the current market price information and incorporated it into the formula, the server (10) moves to Step (436). Similarly, if, in Step (432), the server (10) determines the formula does not comprise a price factor, the server (10) also moves to Step (436), wherein the server (10) determines whether the formula comprises other market control factors.

If the server (10) determines the formula does contain other market control factors, the server (10) moves to Step (438), wherein the server (10) obtains the other market control factors and incorporates them into the formula. A market control factor may include past, present or future weather conditions, in any desired geographic region, other commodity market conditions, equity market status conditions, production cost conditions, market volume conditions, bond market status conditions, interest rate conditions, population conditions, market supply or demand conditions, or any other factors which may have an effect on, or control a particular commodity market. The server (10) monitors the market control factors and obtains market control conditions through direct connection to the market (48) or through a connection to a service provider (440) offering such information via the Web, utilizing an interface (442) such as those described above. Such service providers (440) are well known in the art, and may be designed to provide constantly updated information regarding market control conditions of any of the aforementioned market control factors. Market control conditions nay be retrieved from either private or public information resources.

Once the server (10) has obtained the other market control factors information and incorporated it into the formula, the server (10) moves to Step (444). Similarly, if the server (10) determines the formula does not comprise other market factors, the server (10) also moves to Step (442), where the server (10) utilizes the formula to determine the quantity of the commodity to price at the current market price. In Step (446), the server (10) determines whether the calculated quantity is greater than zero. If the calculated quantity is not greater than zero, the server (10) does not price any of the commodity and returns to Step (418), where the server (10) waits for the clock (416) to signal the server (10) to recalculate the formula at the next predetermined time interval. Conversely, in Step (446), if the server (10) determines that the calculated quantity is greater than zero, the server (10) in Step (448) prices the quantity of commodity calculated by the formula. This quantity may either be a predetermined quantity, or a variable quantity, as determined between the supplier (16) and contractor (44) in creating the particular formula at issue.

Figure 20A:
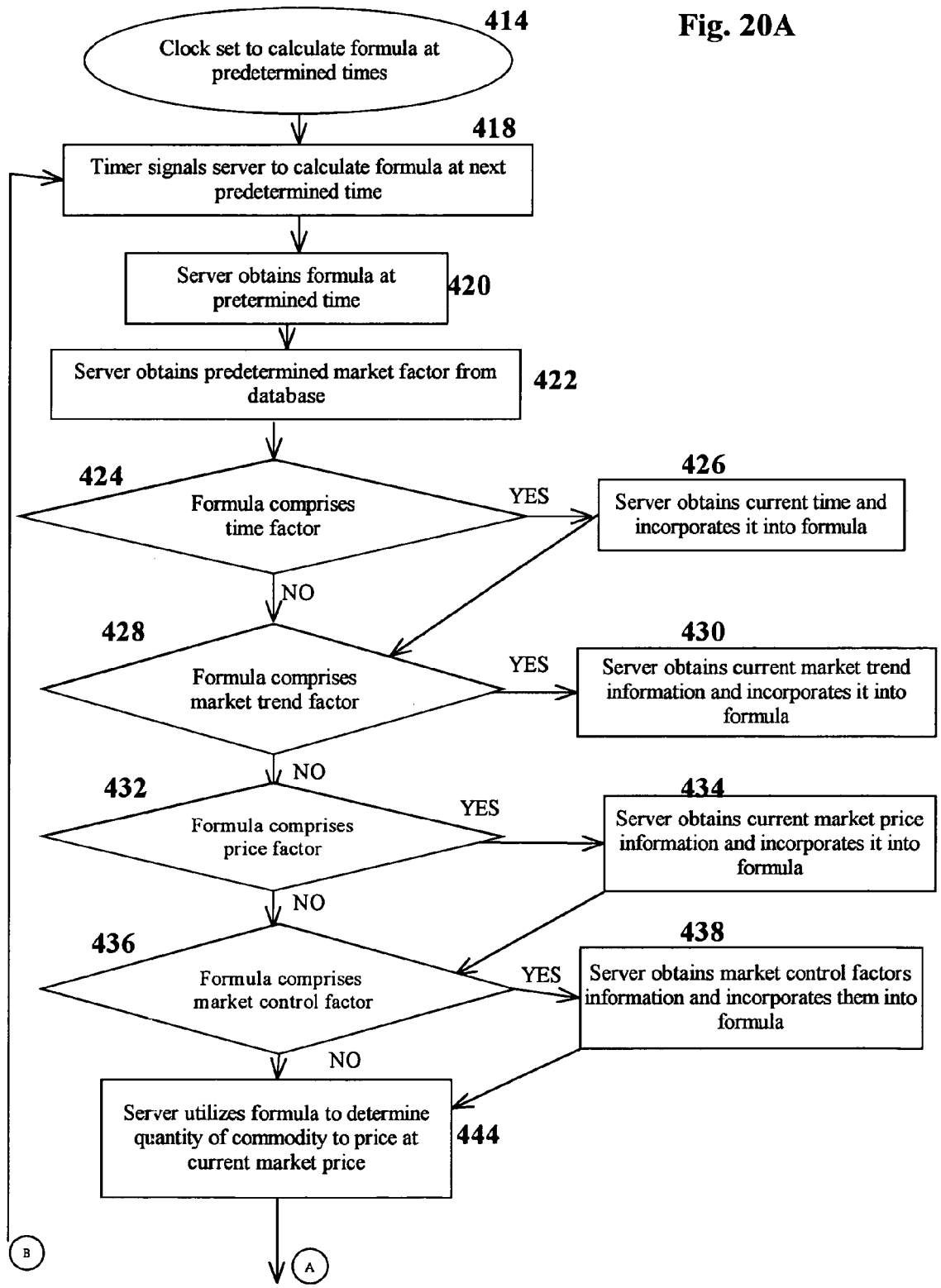
FIGS. 20A–B illustrates a flow chart of an exemplary process for pricing a commodity pursuant to a predetermined formula agreed upon by a supplier and a contractor.
Figure 20B:
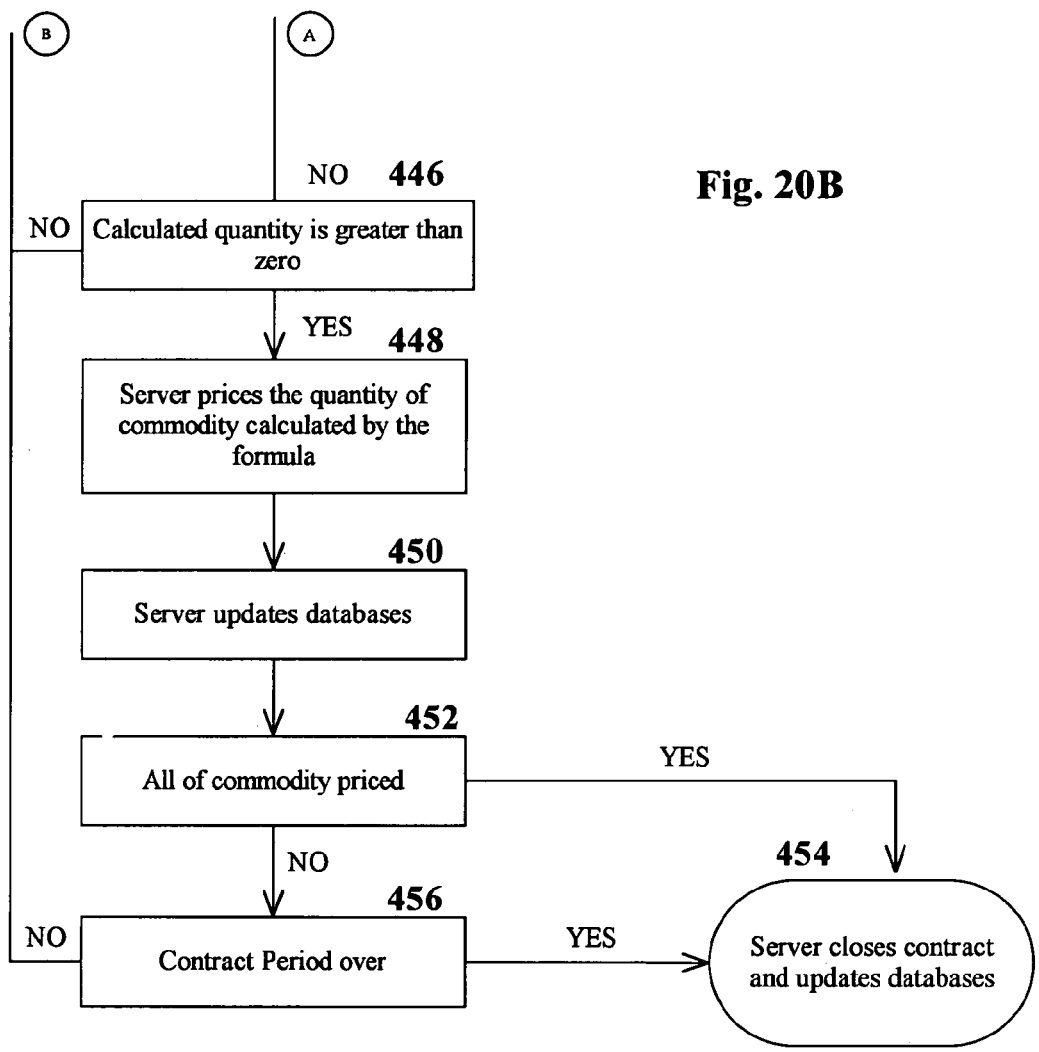

In Step (450), the server (10) updates the databases (56), (58) and (60) to incorporate the updated information and in Step (452), the server (10) determines whether all of the commodity relating to the particular contract has been priced. (FIGS. 1 and 20B). If all of the commodity has been priced, the server (10) in Step (454) closes the contract and updates the databases (56), (58) and (60) to reflect that the contract has indeed been closed. Alternatively, in Step (452), if the server (10) determines that not all of the commodity has been priced, then in Step (456), the server (10) examines whether the contract period is over. If the server (10) determines that the contract period is over, then the server (10) moves to Step (454) in which the server (10) closes the contract and updates the databases (56), (58) and (60). If, however, in Step (456) the server (10) determines the contract period is not over, the server (10) returns to Step (418), wherein the server (10) waits for the clock to signal the server (10) to recalculate the formula at the next predetermined time interval. (FIGS. 1, 20A and 20B).

The foregoing description and drawings merely explain and illustrate the invention, and the invention is not limited thereto, except insofar as the claims are so limited, as those skilled in the art who have the disclosure before them will be able to make modifications and variations therein without departing from the scope of the invention. For example, it is anticipated that any desired means of communication may be utilized between the server (10), supplier (16) and the contractor (44). It is further anticipated that the options menu (68) may be displayed on each web page to facilitate its utilization. It is also anticipated that the server (10) may be operated and maintained by either the supplier (16) or the contractor (44), and that the invention may be utilized in association with an intranet, extranet or stand alone personal computer fed information through a diskette or similar information transfer means known in the art. Additionally, it is anticipated that any suitable formula may be utilized in accordance with the method and apparatus of the resent invention, and that any suitable security measures known in the art may be utilized to limit or restrict access to the server (10) by the supplier (16), contractor (44), or any other entity. Furthermore, it is anticipated that the present invention may be utilized by a buyer of a commodity, in which case the buyer may wish to price a commodity after significant drops in price, rather than after significant increases as described above.

What is claimed is:

1. A computer-implemented method of pre-setting, in a contract, pricing conditions acceptable to a first party to the contract, where the contract defines a pricing period and is with a second party for future delivery of a predetermined quantity of an agricultural commodity, and where the commodity will have a future, unknown, periodic market price not controlled by the first party but established by a market for the commodity, comprising:
    (a) selecting, by entry into a computer by the first party, at least one predetermined market factor related to the contract from a predetermined time factor, a predetermined price factor, a predetermined trend factor, a predetermined market status factor, and a predetermined market control factor;
    (b) determining at a first time period during the pricing period at least one of a first market condition from a first time condition, a first price condition, a first trend condition, a first market status condition, and a first market control condition, and communicating the first market condition to a computer;
    (c) providing a formula capable of comparing said predetermined market factor to said first market condition to determine the existence of a favorable pricing condition for a first portion of the predetermined quantity of the commodity;
    (d) applying with a computer said formula to said predetermined market factor and said first market condition during the pricing period to determine the existence or not of a first favorable pricing condition;
    (e) pricing a first portion of the predetermined quantity of the commodity at the market price established at that time by the market when said application of said formula to said predetermined market factor and said first market condition indicates the existence of said first favorable pricing condition, and storing the pricing of the first portion in a computer;
    (f) determining at a second time period during the pricing period a second market condition from a second time condition, a second price condition, a second trend condition, a second market status condition and a second market control condition, and communicating the first market condition to a computer,
    (g) applying with a computing device said formula to said predetermined market factor and said second market condition during the pricing period to determine the existence or not of a second favorable pricing condition; and
    (h) pricing a second portion of the predetermined quantity of the commodity at a market price established by the market when said application of said formula to said predetermined market factor and said second market condition indicates the existence of said second favorable pricing condition, and storing the pricing of the second portion in a computer;
    so that future pricing of different portions of the predetermined quantity of the commodity by criteria input by and acceptable to the first party are built into the contract for future delivery of the commodity at the formation of the contract, even though the future pricing will be controlled by the market, and not the first party.

2. The method of pricing a commodity of claim 1, further comprising receiving from the first party information relating to a specific type and amount of the commodity which said first party is willing to supply.

3. The method of pricing a commodity of claim 2, further comprising generating a contract for pricing of said specific type and amount of the commodity by said first party.

4. The method of pricing a commodity of claim 2, further comprising generating a contract for the pricing of said specific type and amount of the commodity according to the formula.

5. The method of pricing a commodity of claim 2, wherein said information is received from said first party across a global computer network.

6. The method of pricing a commodity of claim 2, further comprising automatically pricing said first portion of the commodity across a computer network when said application of said formula to said predetermined market factor and said first market condition indicates the existence of said first favorable pricing condition.

7. The method of pricing a commodity of claim 6, wherein said computer network is a global computer network.

8. The method of pricing a commodity of claim 1, further comprising:
    (a) providing a computer with a database;
    (b) storing said predetermined market factor and said formula on said database;
    (c) determining at least two time periods and related market conditions from a related time condition, a related price condition, a related trend condition, a related market status condition and a related market control condition;
    (d) applying said computer to said predetermined market factor and said related market conditions to determine the existence of favorable pricing conditions; and
    (e) pricing portions of the predetermined quantity of the commodity when said computer indicates the existence of said favorable pricing conditions.

9. The method of pricing a commodity of claim 1, wherein said predetermined market factor is a predetermined time factor, wherein said first market condition is a first time condition, wherein said second market condition is a second time condition, further comprising pricing the first portion of the predetermined quantity of the commodity when said first market condition is met, and pricing the second portion of the predetermined quantity of the commodity when said second market condition is met.

10. The method of pricing a commodity of claim 9, wherein said first time condition is a trading day, and wherein said second time condition is the next consecutive trading day, and wherein said first portion of the predetermined quantity of the commodity is equal to said second portion of the predetermined quantity of the commodity.

11. The method of pricing a commodity of claim 9, wherein said first time condition is a trading day, and wherein said second time condition is the next consecutive trading day, and wherein said first portion of the predetermined quantity of the commodity is different than said second portion of the predetermined quantity of the commodity.

12. The method of pricing a commodity of claim 1, wherein said predetermined market factor is a predetermined trend factor comprising historical prices correlated with predetermined periods of time.

13. The method of pricing a commodity of claim 12, further comprising pricing a larger portion of the predetermined quantity of the commodity during a first time period associated with historically higher prices, and a smaller portion of the predetermined quantity of the commodity during a second time period associated with historically lower prices.

14. The method of pricing a commodity of claim 1, wherein said predetermined market factor is a predetermined trend factor comprising an algorithm capable of identifying market price trends.

15. The method of pricing a commodity of claim 14, wherein said algorithm is capable of identifying variances from said market price trends.

16. The method of pricing a commodity of claim 15, wherein said first favorable pricing condition is a variance from said market price trends greater than a predetermined amount.

17. The method of pricing a commodity of claim 15, wherein said first favorable pricing condition is a failure of an upward market price trend to continue to grow by a predetermined factor.

18. The method of pricing a commodity of claim 1, wherein said predetermined market factor is a predetermined market status factor related to the volatility of a market.

19. The method of pricing a commodity of claim 18, wherein said first favorable pricing condition is a condition wherein said volatility of said market exceeds a predetermined factor.

20. The method or pricing a commodity of claim 1, wherein said predetermined market factor is a predetermined market control factor related to a global climate in a predetermined geographic region at a predetermined time.

21. A computer-implemented method of pre-setting pricing conditions acceptable to a first party to a contract for future delivery of a predetermined quantity of a commodity that will have a future periodic market price established by a market for the commodity and a pricing period comprising:
   (a) providing a computer having a database;
   (b) receiving from the first party information relating to a specific type and quantity of the commodity and storing the information in the database;
   (c) receiving from said first party a selection of a predetermined market factor from a predetermined time factor, a predetermined price factor, a predetermined trend factor, a predetermined market status factor and a predetermined market control factor and storing the information in the database;
   (d) determining at a plurality of time periods during the pricing period, related market conditions selected from a related time condition, a related price condition, a related market status condition and a related market control condition;
   (e) providing a formula capable of comparing said predetermined market factor to said related market conditions to determine the existence of favorable pricing conditions for portions of the predetermined quantity of the commodity;
   (f) applying, in the computer, said formula to said predetermined market factor and said related market conditions during the pricing period to determine the existence of said favorable pricing conditions;
   (g) automatically pricing, and storing in the database said portions of the predetermined quantity of the commodity at the market price established by the market when said application of said formula to said predetermined market factor and said related market conditions indicates the existence of said favorable pricing conditions.

22. The method of pricing a commodity of claim 21, wherein said information is received from said first party over a computer network.

23. The method of pricing a commodity of claim 21, wherein said information is received from said first party over a global computer network.

24. The method of pricing a commodity of claim 23, further comprising generating a contract for the pricing of said type and quantity of the commodity according to said predetermined market factor and said formula.

25. The method of pricing a commodity of claim 23, further comprising executing said contract with digital signatures.

26. The method of pricing a commodity of claim 23, wherein said time periods are at least two consecutive trading days of a commodity market.

27. The method of pricing a commodity of claim 23, further comprising pricing said portions of the commodity on at least two different days.

28. A system for pre-setting pricing conditions during a pricing period acceptable first party to a contract for future delivery of a predetermined quantity of a commodity that will have future periodic market prices established by a market for the commodity over a network comprising:
   (a) a server,
   (b) a remote terminal;
   (c) a communication link between said server and said remote terminal;
   (d) means coupled to said server for receiving from the first party, across said communication link, information relating to a specific type and quantity of the commodity;
   (e) a predetermined market factor selected from a predetermined time factor, a predetermined price factor, a predetermined trend factor, a predetermined market status factor and a predetermined marker control factor,
   (f) means for determining at a plurality of time related market conditions selected from a related time condition, a related price condition, a related market status condition and a predetermined market control condition;
   (g) a formula capable of comparing said predetermined market factor to said related market conditions to determine the existence of favorable pricing conditions for portions of the predetermined quantity of the commodity;

(h) means for applying said formula to said predetermined market factor and said related market conditions to determine the existence of said favorable pricing conditions during the pricing period; and (i) means for pricing said portions of the predetermined quantity of the commodity at the market price established by the market when said application of said formula to said predetermined market factor and said related market conditions indicates the existence of said favorable pricing conditions.

29. A computer-implemented method for one or more parties to capitalize on future volatility of market prices, set by a market and not by any of the parties, during a pricing period set in a contract that requires future delivery of a predetermined quantity of a substantially fungible commodity comprising:

(a) providing a computer having a database;

(b) receiving from a first party and storing in the database information relating to the contract, including a specific type and quantity of the commodity, the pricing period, and delivery time and location;

(c) receiving from said first parry and storing in the database a predetermined market factor selected by the first party, the predetermined market factor comprising one or more of a predetermined time factor, a predetermined price factor, a predetermined trend factor, a predetermined marker status factor and a predetermined market control factor;

(d) forming the contract between at least the first party and a second party and starting the pricing period;

(e) determining, at a plurality of time periods during the pricing period, related marker conditions selected from a related time condition, a related price condition, a related market status condition and a related market control condition;

(f) storing in the database a formula capable of comparing said predetermined market factor to said related marker conditions to determine the existence of a favorable pricing condition for different portions of the predetermined quantity of the commodity;

(g) applying, during said pricing period, said formula to said predetermined market factor and said related marker conditions to determine the existence of a said favorable pricing condition;

(h) automatically pricing said portions of the predetermined quantity of the commodity when said application of said formula to said predetermined market factor and said related market conditions indicates the existence of said favorable pricing conditions by acquiring market price for the commodity at that time and storing market price in the database;

(i) checking if all portions of the commodity have been priced or the pricing period is expired.

* * * * *